United States Patent
Mousa et al.

(10) Patent No.: US 10,436,925 B2
(45) Date of Patent: Oct. 8, 2019

(54) METHOD FOR PROCESSING MARINE SEISMIC DATA

(71) Applicant: KING FAHD UNIVERSITY OF PETROLEUM AND MINERALS, Dhahran (SA)

(72) Inventors: Wail A. Mousa, Dhahran (SA); Haroon Ashraf, Rawalpindi (PK)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/382,769

(22) Filed: Apr. 12, 2019

(65) Prior Publication Data
US 2019/0235114 A1 Aug. 1, 2019

Related U.S. Application Data

(63) Continuation of application No. 15/149,702, filed on May 9, 2016, now Pat. No. 10,324,209.
(60) Provisional application No. 62/159,062, filed on May 8, 2015.

(51) Int. Cl.
*G01V 1/36* (2006.01)
(52) U.S. Cl.
CPC ........ *G01V 1/364* (2013.01); *G01V 2210/324* (2013.01)
(58) Field of Classification Search
CPC .......... G01V 1/364; G01V 1/28; G01V 1/302; G01V 2210/324; G01V 2210/642
See application file for complete search history.

(56) References Cited

U.S. PATENT DOCUMENTS

| 5,119,027 A * | 6/1992 | Ehrhardt | G01R 33/56 324/307 |
| 5,487,052 A | 1/1996 | Cordsen | |
| 5,963,879 A | 10/1999 | Woodward et al. | |
| 8,577,184 B2 * | 11/2013 | Young | G06T 3/4069 382/280 |
| 9,105,075 B1 | 8/2015 | Yu et al. | |

OTHER PUBLICATIONS

V. Bardan, "Hexagonal Binning in 3D Seismic Data Acquisition", 64th EAGE Conference & Exhibition, May 27, 2002, 1 page (Abstract only).
Virgil Bardan, "A hexagonal sampling grid for 3D recording and processing of 3D seismic data", Geophysical Prospecting, vol. 45, Issue 5, Oct. 30, 2003, pp. 819-813 (Abstract only).
(Continued)

*Primary Examiner* — Elias Desta
(74) *Attorney, Agent, or Firm* — Oblon, McClelland, Maier & Neustadt, L.L.P.

(57) ABSTRACT

Aspects of the disclosure provide a method for processing three-dimensional (3D) hexagonally sampled seismic data. The method can include receiving 3D hexagonally sampled seismic data represented using 3D spiral architecture (SA), the 3D hexagonally sampled seismic data including a plurality of data traces each corresponding to center of a hexagon in the 3D SA, representing the 3D hexagonally sampled seismic data as two-dimensional (2D) seismic data using spiral architecture (SA) addressing scheme, and processing the 2D seismic data with an SA based signal processing process.

6 Claims, 24 Drawing Sheets

(56) References Cited

OTHER PUBLICATIONS

Xiangjian He, et al., "A New Simulation of Spiral Architecture", Conf. on Image Proc., Computer Vision, & Pattern Recog. (IPCV'06), 2006, pp. 570-575.
Qiang Wu, et al., "Image Rotation without scaling on Spiral Architecture", Journal of WSCG, vol. 10, No. 1-2, 2002, pp. 559-564.
Deere, "3D Hexagonal Prestack Depth Migration of Seismic Data", 2007, The Leading Edge Publication, pp. 1262-1265.

* cited by examiner

| + | 0 | 1 | 2 | 3 | 4 | 5 | 6 |
|---|---|---|---|---|---|---|---|
| 0 | 0 | 1 | 2 | 3 | 4 | 5 | 6 |
| 1 | 1 | 63 | 15 | 2 | 0 | 6 | 64 |
| 2 | 2 | 15 | 14 | 26 | 3 | 0 | 1 |
| 3 | 3 | 2 | 26 | 25 | 31 | 4 | 0 |
| 4 | 4 | 0 | 3 | 31 | 36 | 42 | 5 |
| 5 | 5 | 6 | 0 | 4 | 42 | 41 | 53 |
| 6 | 6 | 64 | 1 | 0 | 5 | 53 | 52 |

| x | 0 | 1 | 2 | 3 | 4 | 5 | 6 |
|---|---|---|---|---|---|---|---|
| 0 | 0 | 0 | 0 | 0 | 0 | 0 | 0 |
| 1 | 0 | 1 | 2 | 3 | 4 | 5 | 6 |
| 2 | 0 | 2 | 3 | 4 | 5 | 6 | 1 |
| 3 | 0 | 3 | 4 | 5 | 6 | 1 | 2 |
| 4 | 0 | 4 | 5 | 6 | 1 | 2 | 3 |
| 5 | 0 | 5 | 6 | 1 | 2 | 3 | 4 |
| 6 | 0 | 6 | 1 | 2 | 3 | 4 | 5 |

Response slice for $K_x = 0$

Response slice for $K_y = 0$

Response slice for f = 40 Hz

Response slice for $K_x = 0$

Response slice for $K_y = 0$

Response slice for $f = 40$ Hz

Response slice for $K_x = 0$

Response slice for $K_y = 0$

Response slice for $f = 40$ Hz

Response slice for $K_x = 0$

Response slice for $K_y = 0$

Response slice for f = 40 Hz

Rectangularly sampled data    EPS on rectangular data

Hexagonally sampled data    EPS on hexagonal data

Rectangularly sampled data · EPS on rectangular data

Hexagonally sampled data · EPS on hexagonal data

Rectangularly sampled data     EPS on rectangular data

Hexagonally sampled data     EPS on hexagonal data

Rectangularly sampled data

EPS on rectangular data

Hexagonally sampled data

EPS on hexagonal data

METHOD FOR PROCESSING MARINE SEISMIC DATA

CROSS-REFERENCE TO RELATED APPLICATIONS

The present application is a Continuation of Ser. No. 15/149,702, now allowed, having a filing date of May 9, 2016 which claims benefit of priority to U.S. provisional application No. 62/159,062 having a filing date of May 8, 2015, which is incorporated herein by reference in its entirety.

INCORPORATION BY REFERENCE

The present disclosure claims the benefit of U.S. Provisional Application No. 62/159,062, "A Method and System for Managing, Acquiring, Processing and Interpreting 3D Hexagonally Sampled Seismic Data" filed on May 8, 2015, which is incorporated herein by reference in its entirety. In addition, a thesis of Mr. Haroon Ashraf titled "Efficient Approach for Processing of Hexagonally Sampled Exploration Seismic Data Using Spiral Architecture" for Master of Science in Electrical Engineering at King Fahd University of Petroleum and Minerals, May 2015, Dhahran Saudi Arabia, is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In order to make successful explorations of natural resources such as oil and gas, which are hidden in sub-earth structures, higher resolution subsurface imaging techniques can be employed. However, higher resolution techniques lead to huge amount of seismic data causing handling and processing related hurdles. Hexagonal sampling in the spatial domain offers a solution to the hurdles associated with increased resolution.

SUMMARY

Aspects of the disclosure provide a method for processing three-dimensional (3D) hexagonally sampled seismic data. The method can include receiving 3D hexagonally sampled seismic data represented using 3D spiral architecture (SA), the 3D hexagonally sampled seismic data including a plurality of data traces each corresponding to center of a hexagon in the 3D SA, representing the 3D hexagonally sampled seismic data as two-dimensional (2D) seismic data using spiral architecture (SA) addressing scheme, and processing the 2D seismic data with an SA based signal processing process.

In an example, the 3D hexagonally sampled seismic data is generated from a hexagonal grid of receivers. In another example, 3D hexagonally sampled seismic data is transformed from seismic data generated from a rectangular grid. In a further example, the 3D hexagonally sampled seismic data is an intermediate production of a stage of a seismic data processing process.

In an embodiment, the step of representing the 3D hexagonally sampled seismic data as two-dimensional (2D) seismic data using spiral architecture (SA) addressing scheme includes assigning a spiral address to each data trace of the 3D hexagonally sampled seismic data, and storing the data traces in an order of the spiral addresses.

In one embodiment, the step of processing the 2D seismic data with an SA based signal processing process includes defining constraints for a finite impulse response (FIR) filter for removing noise from the 2D seismic data, deriving the FIR filter using an iterative process, and using the derived FIR filter to remove noise from the 2D seismic data. The step of deriving the FIR filter using an iterative process can include: (i) computing a 3D SA Fourier transform of a FIR filter obtained from a previous iteration; (ii) applying frequency-wavenumber domain constraints to the FIR filter in frequency-wavenumber domain; (iii) computing an inverse 3D SA Fourier transform of the FIR filter with applied constraints in frequency-wavenumber domain; (iv) applying time-space domain constrains to the FIR filter in time-space domain to obtain an iterated FIR filter; (v) calculating a mean-squared error between the FIR filter obtained from the previous iteration and the FIR iterated filter; and (vi) repeating the steps (i) to (v) until the mean-squared error is smaller than a predefined threshold.

In another embodiment, the step of processing the 2D seismic data with an SA based signal processing process includes defining a Sobel filter based on SA for processing the 2D seismic data, and applying the defined Sobel filter on the 2D seismic data for edge detection.

In a further embodiment, the step of processing the 2D seismic data with an SA based signal processing process includes performing an edge preserving smoothing process that comprises selecting a data sample from an image of subsurface generated from the 2D seismic data, identifying a most homogenous neighborhood from neighborhoods defined based on SA around the selected data sample, calculating an average of data samples in the most homogenous neighborhood, and replacing value of the selected data sample with the calculated average.

Aspects of the disclosure provide a non-transitory computer readable medium storing program instructions which, when executed by a processor, causes the processor to perform a method for processing three-dimensional (3D) hexagonally sampled seismic data.

Aspects of the disclosure provide a computer system for processing three-dimensional (3D) hexagonally sampled seismic data. The computer system includes a processor configured to execute instructions, and a memory configured to store instructions for causing the processor to perform operations of a method for processing three-dimensional (3D) hexagonally sampled seismic data.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

During seismic survey, artificial seismic waves are produced and reflections of the seismic waves are recorded at receivers. Such acquired seismic data is processed using appropriate seismic data processing techniques to reveal an image of the sub-surface. Subsequently, by analyzing layers presented in the sub-surface image, geologists can predict structures that may contain hydrocarbons. The major constraints in seismic reflection data processing arise from the huge data set involved. In one example, the amount of data recorded during just one medium sized marine three-dimensional (3D) survey can fill 20,000 compact discs forming a stack over 650 feet high where rectangular sampling is used.

According to an aspect of the disclosure, in order to reduce the size of seismic data, hexagonal sampling instead of rectangular sampling can be used. Due to the fact that seismic data in the wavenumber domain is circularly band limited, hexagonal sampling requires 13.4% less number of samples to represent the same data in comparison to rectangular sampling while maintaining a same level of accuracy. A hexagonal sampling grid has alternative rows (or columns) places half sample interval with respect to the other rows (or columns). Each sample has six equidistant neighbors. The fundamental strength of hexagonal sampling is its symmetry: in a sampling grid, a regular hexagon is 50% more symmetric than a square, exhibiting a 12 fold as opposed to 8 fold symmetry. This forms one basis of the efficiency of the hexagonal sampling technique.

Spiral architecture (SA) was introduced in 1996 for machine vision on a hexagonal lattice. Spiral architecture provides a model closer to biological vision systems while offering advantages over the regular rectangular pixel image representation. Each pixel in SA has the shape of a hexagon. In addition, SA introduces a special addressing scheme which identifies each hexagon of the structure with a unique one-dimensional (1D) address in base seven. This addressing allows the handling of two-dimensional (2D) signals as 1D signals.

Aspects of the disclosure provide a hexagonal signal processing approach for processing 3D hexagonally sampled seismic data. The hexagonal signal processing approach is based on 3D SA which transforms a 3D problem to a 2D problem for processing hexagonally sampled seismic data. Specifically, a 3D noise attenuation filter using projection on convex sets based on SA, an edge detection algorithm based on SA, and an edge preserving smoothing (EPS) algorithm based on SA are described.

Figure 1A:
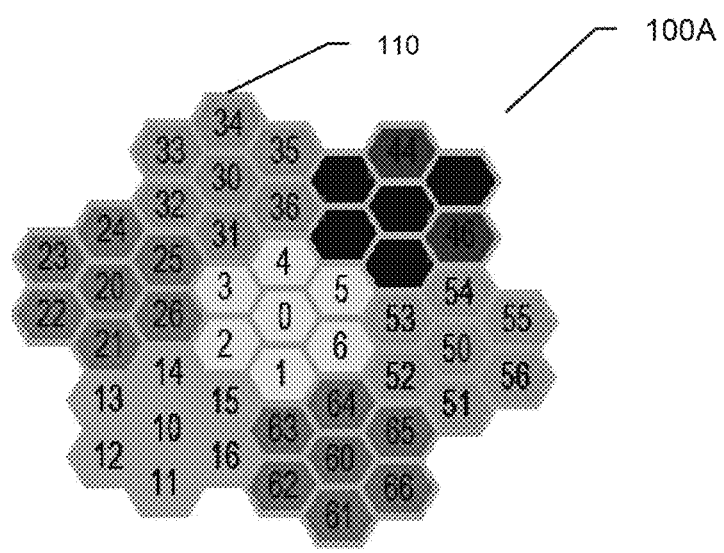
FIG. 1A shows a collection of hexagons arranged in spiral architecture (SA)

Hexagonal Signal Processing Approach and Addressing Scheme in Spiral Architecture In various examples, various signal processing techniques for processing hexagonally sampled seismic data are based on SA. FIG. 1A shows a collection of hexagons arranged in SA. As shown, a plane is tiled with a collection of hexagons. Each hexagon has six neighboring hexagons with the same distance to it. Each hexagon is identified by a number of base 7, referred as a spiral address. The numbered (or addressed) hexagons form a cluster of size $7^n$, where n is a positive integer indicating an aggregation level of the cluster. These hexagons starting from address 0 towards address 7" tile the plane in a recursive modular manner along a spiral-like curve. As an example, FIG. 1A shows a cluster 100A of hexagons with size of $7^2$.

As an example, the cluster 100A includes a hexagon 110 having a spiral address of "34". The number of digits demonstrates the aggregate level, i.e., aggregate level 2 in case of "34". "3" represents the position of the hexagon 110 within the second level aggregation, and "4" represents the position of the hexagon within the first level aggregation.

Handling 3D Seismic Data as 2D Data

Figure 1B:
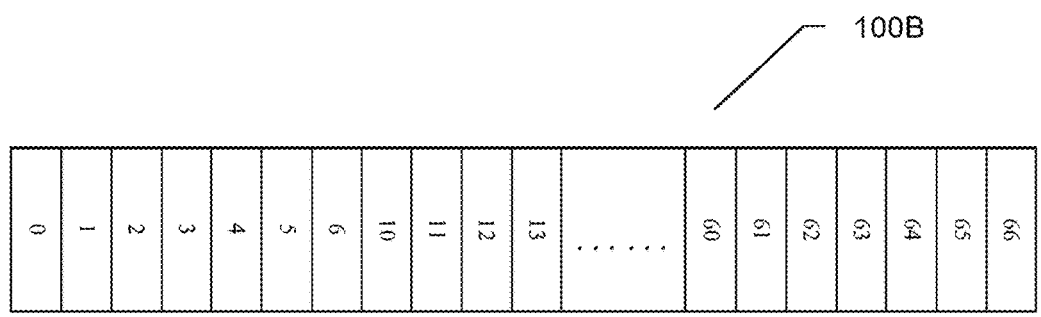
FIG. 1B shows a one-dimensional (1D) array representing two-dimensional (2D) data image data.

Based on SA addressing scheme, 2D data can be represented as 1D data, such as an 1D array. For example, hexagonal sampled image data includes pixels in hexagon shape arranged in a SA as shown in FIG. 1A. Accordingly, pixel values can be saved as a vector according to the order of the spiral addresses of each pixel as shown in FIG. 1B. FIG. 1B shows a 1D array 100B representing 2D data image data. In FIG. 1B example, the order of the spiral addresses is 0, 1, 2, 3, 4, 5, 6, 10, 11, 12, . . . , 65, 66.

Figure 2A:
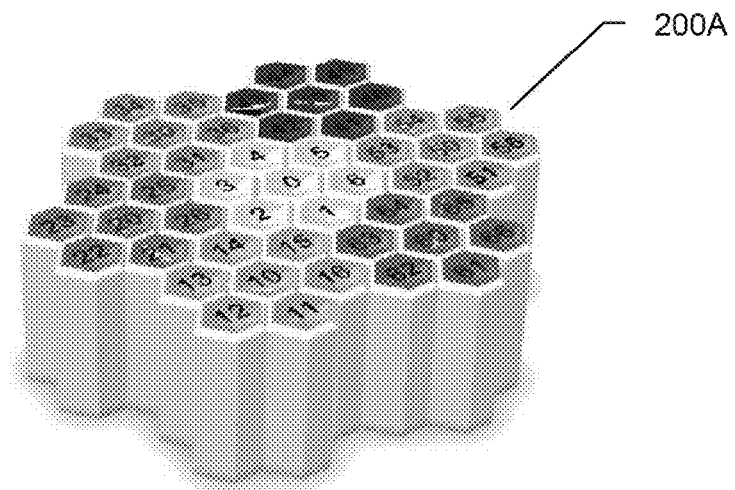
FIG. 2A shows a three-dimensional (3D) data structure arranged in SA.
Figure 2B:
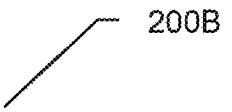
FIG. 2B shows a 2D array representing 3D data represented by a 3D data structure.

Similarly, a 3D data set can be represented by a 2D array based on SA. FIG. 2A shows a 3D data structure 200A arranged in SA. For example, hexagonally sampled seismic data can be mapped to this data structure 200A. Specifically, each receiver position in a hexagonal sampling grid corresponds to one hexagon (center of one hexagon) in the data structure 200A. Each data trace generated at a receiver corresponds to a hexagonal prism in the data structure 200A. FIG. 2B shows a 2D array 200B representing 3D data represented by the 3D data structure 200A. Each column in the 2D array 200B corresponds to a data trace. Columns are arranged in an order of their spiral addresses shown in FIG. 2A.

A 3D Data structure based on SA, such as the FIG. 2A example, is referred to as a 3D SA, or enhanced SA in this specification. It is noted that the seismic data represented in a 3D SA is not limited to seismic data collected at receivers during a seismic survey employing a hexagonal sampling grid. The seismic data represented in a 3D SA can be an intermediate production of a stage of a seismic data processing process, such as a stage of acquisition or interpretation.

Addition Operation and Multiplication Operation

The spiral architecture addressing scheme can be considered as a positional number system with base 7. The addresses indicate spatial location in the Euclidian plane with respect to the origin. Thus, each digit within an address gives angle and distance from origin. In this case, the addresses behave like vector quantities. The addresses are vectorial in nature.

Figures 3, 4:
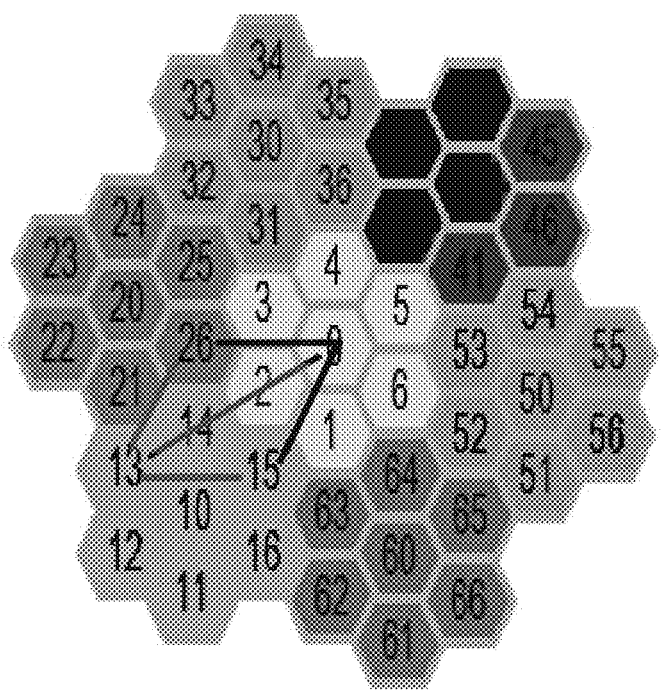
FIG. 3 shows another collection of hexagons arranged in SA.
FIG. 4 shows a general rule for addition in SA.

So the addresses that need to be added can be considered as vectors with one end at the origin and other at the corresponding address. For example to display address 15 in vector form, a line needs to be drawn from origin 0 to 15 as shown in FIG. 3. Similarly address 26 has been shown. Since these two are vectors there addition is performed just like vector addition which results in address 13 as shown in FIG. 3. In a similar manner subtraction is performed. The general rule for addition in SA is given as in FIG. 4.

Multiplication can also be defined in vectorial terms. The effect of multiplication is scaling and rotation. The following formula shows the effect of multiplication:

General Multiplication by $n$=Rotation by $(n-1)\times 60$ degrees

For example, the result of multiplying 14 by 2 will be rotation of 14 by $(2-1)\times 60$ degrees which is equal to 60 degrees rotation of 14. This results in 25 in this case which can be seen by observing the addresses 14 and 25 in FIG. 3. The general rule of multiplication can be seen from FIG. 5.

The arithmetic operations can result in answers which may lie outside the aggregate level for example addition of 62 with 62 will result in an answer which will lie in aggregate three. In order to tackle this problem, we use closed arithmetic techniques. The general rules of closed arithmetic operations are given as follows:

Closed Addition = $a + b \mod[10^\lambda]$

Closed Subtraction = $a - b \mod[10^\lambda]$

Closed Multiplication $a \times b = a \times b \mod 10^\lambda$ if $b$ is not a multiple of 10

Figures 5, 6:
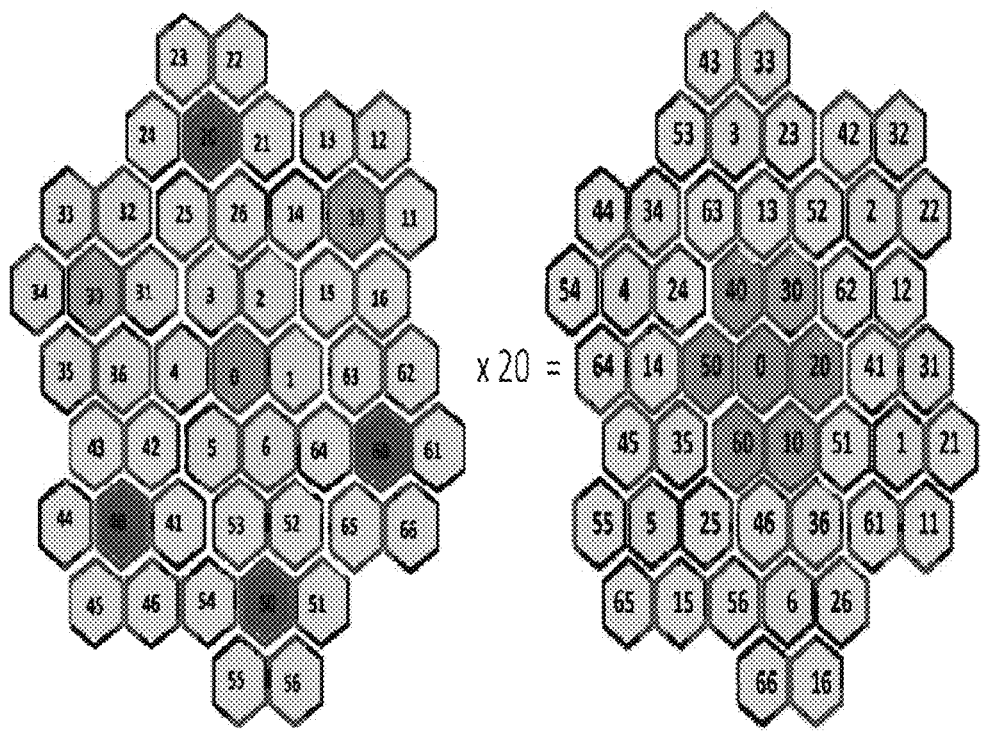
FIG. 5 shows a general rule for multiplication in SA.
FIG. 6 shows an example of closed multiplication by 20.

Closed Multiplication $a \times b = \left( (a \times b) + \left( \frac{a \times b}{10^\lambda} \right) \right) \mod[10^\lambda]$ An example of closed multiplication by 20 has been shown in FIG. 6. As shown, multiplication with 20 results in the rearrangement of all the pixels.

Spiral Neighborhood and Processing Operations

The SA addressing scheme (also referred to as hexagonal addressing scheme) that has been devised covers an infinite space. Seismic signals and images are, however, finite space. Consequently, a limited number of layers need to be considered when dealing with hexagonal sampled data. Addresses in a $\lambda$-level 2D data belong to $G^\lambda$. However, operations may lead to addresses which lie outside the originally defined region. The first approach to deal with such scenario is to use closed arithmetic which has already been discussed above. The second approach is to consider these addresses as boundary addresses. There are a total of $7^\lambda$ addresses for a $\lambda$-level 2D data. These addresses are numbered 0 to $7^\lambda-1$. The addresses of external points start from $7^\lambda$ and extend to infinity.

Aggregate level 2 has total 49 pixels with addresses ranging between 0 and 66 and stored like a vector 0, 1, 2, 3, . . . , 48. Thus the 49th element in hexagonal addressing scheme i.e., 100 (base 7 address) is an external point. Any point greater than 100 is also an external point. It is noted that external points extend to infinity.

Figure 7:
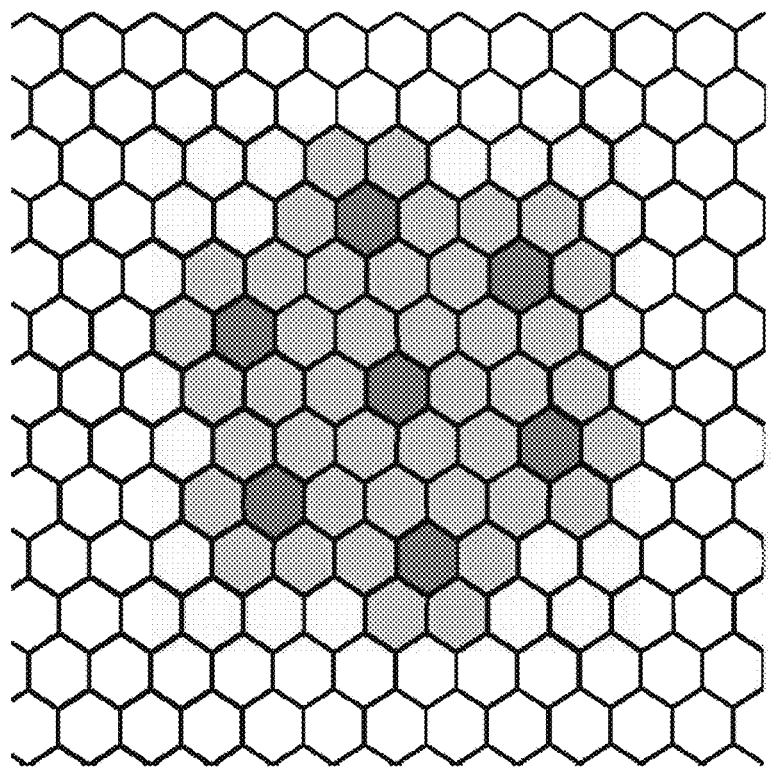
FIG. 7 shows boundary addresses for aggregate level 2 in SA.

The addresses which have at least one out of six neighboring hexagonal addresses as external addresses are called boundary addresses. A boundary address will have at least one neighbor outside the layer level. A boundary address is itself a part of the A-level image. The boundary addresses for aggregate level 2, i.e., 49 addresses are shown in FIG. 7. The white points are external points is FIG. 7.

A valid distance measure has the following properties:

Positive definiteness d (a, b)$\geqslant$ 0 Equality only if a=b.

Symmetry d (a, b)=d (b, a).

Triangular Inequality d (a, b)$\leqslant$ d (a, c)+d (c, b).

In spiral architecture, these properties of distance measures are valid because of the vectorial nature of hexagonally sampled SA addressing scheme. Generally distance measures are defined with respect to a set of axes. Since SA employs positional numbering system, it is difficult measure distance directly. Thus, distance measures are calculated by employing different coordinate schemes. Using Hers 3 coordinate system the distance of a (a1,a2,a3) and b(b1,b2, b3) is given as:

$$d(a, b) = \left(\frac{1}{2}\right) \times (|a_1 - b_1| + |a_2 - b_2| + |a_3 - b_3|).$$

Figure 8:
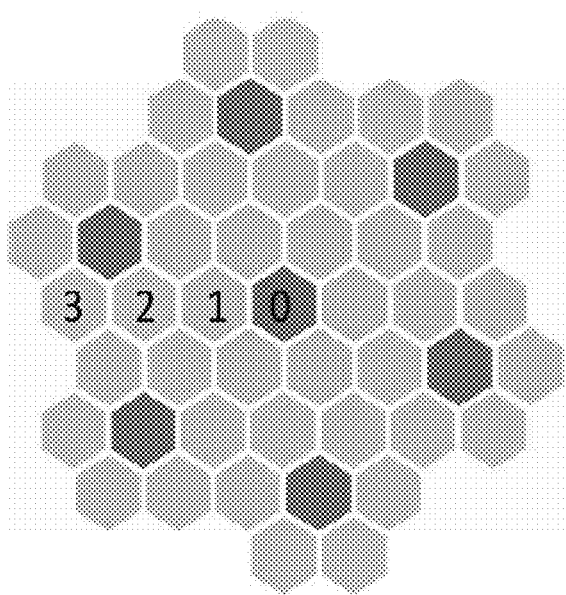
FIG. 8 shows an example of Her's distance measures.

In Hers coordinate system there are 3 axes, each at 60 degrees to each other. A two axis approach can also be used to define distance measures. As an example, the Her's distance measures are shown in FIG. 8.

Figure 9:
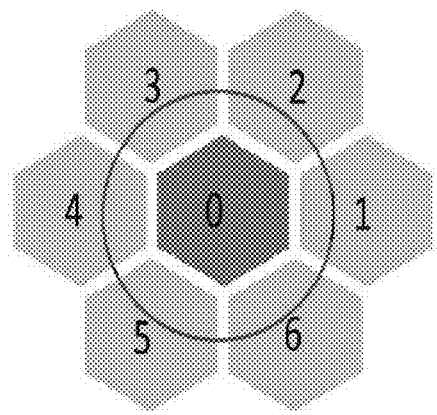
FIG. 9 shows a neighborhood for address 0 in SA.

Neighborhood is one of the basic relationships which are used in many processing techniques. Neighbors have either a common edge or a corner. In SA framework, neighbors share common edges. In SA, an address contains 6 neighbors. This group of seven hexagonal tiles is the fundamental neighborhood that can be characterized as a first level aggregate. In the neighborhood shown for address 0 all the neighbors are equidistant from the address under consideration as shown in FIG. 9.

This neighborhood can be defined as $N_1(x)=x, x+1, x+2, x+6$. The second level neighborhood can be derived by using the formula of the first level neighborhood. Thus, the second neighborhood is the first neighborhood $N_1$ along with the first neighborhoods of every address in the first neighborhood $N_2(x)=N_1(x)UN_1(x+1)UN_1(x+2), UN_1(x+6)$. Thus the neighborhood of any distance level can be recursively found using:

$$N_n(x)=N_{n-1}(x)UN_{n-1}(x+1)UN_{n-1}(x+2), UN_{n-1}(x+6).$$

If x is taken 0 the second neighborhood gives the following points:
N2(0)=0, 1, 2, 3, 4, 5, 6, 14, 15, 25, 26, 36, 31, 41, 42, 52, 53, 63, 64.
N2 contains 19 elements:
Original address;
6 immediate neighbors;
Another 12 neighbors which are the unique neighbors of the original N1 neighborhood.

The number of elements, cardinality, in this definition of neighborhood can be generally given as follows:

$$\text{card}(N_n)=3n^2+3n+1.$$

The neighborhood can also be defined using aggregate levels. The first level neighborhood is similar to previous definition. The second level can be defined as follows:

$$N_2^h=N_1^h(x)UN_1^h(x+10)UN_1^h(x+20)U \ldots N_1^h(x+60)$$

Thus, a general definition of this neighborhood can be given as follows:

$$N_n^h=N_{n-1}^h(x)UN_{n-1}^h(x+10)UN_{n-1}^h(x+2\times10^{n-1}U \ldots N_{n-1}^h(x+6\times10^{n-1}).$$

Convolution is extensively employed in signal processing. Convolution is a neighborhood process where the value of a location/address is replaced by the weighted sum of values in its neighborhood. The addresses of neighboring elements can be easily calculated by employing the neighborhood definitions explained above. Convolution of a 2D data I with a λ-level mask can be given by, $$M(x)*I(x)=\Sigma M(k)\times I(x-k)$$

In the above equation, * denotes convolution and negative sign represents spiral architecture's subtraction. It is noted that the above equation employs utilizes single summation. Thus from a computational point of view, a 2D data convolution employs one loop only. This is due to the two dimensional data being represented as a one dimension array. This implies that the computation of convolution of an entire 3D data with a 3D kernel requires only a couple of loops. On the other hand the convolution on rectangular sampled data requires four loops i.e., double than the spiral convolution scheme.

Frequency Domain Processing

Hexagonal sampled data is periodic with a periodicity matrix. The images are periodic in an image of order one higher than the original image. For a given hexagonal sampled image x of order λ:

$$x(n)=x(n+N_\lambda r).$$

In the above equation, n and r are integer vectors. The number of sample points in a period is equal to det $[N_\lambda]$ which is 7, where the set of points in the spatial domain samples be $I_{N\lambda}$, or the set of points in the spectral domain samples be $J_{N\lambda}$.

The sequence x(n) can be expanded as a Fourier series with coefficients denoted as X(k), where:

$$X(k) = \sum_{n \in G^\lambda} x(n)\exp(-2\pi jk^T N_\lambda^{-1} n)$$

$$x(n) = \frac{1}{|\det N_\lambda|} \sum_{k \in G^\lambda} X(k)\exp(2\pi jk^T N_\lambda^{-1} n).$$

Figure 10:
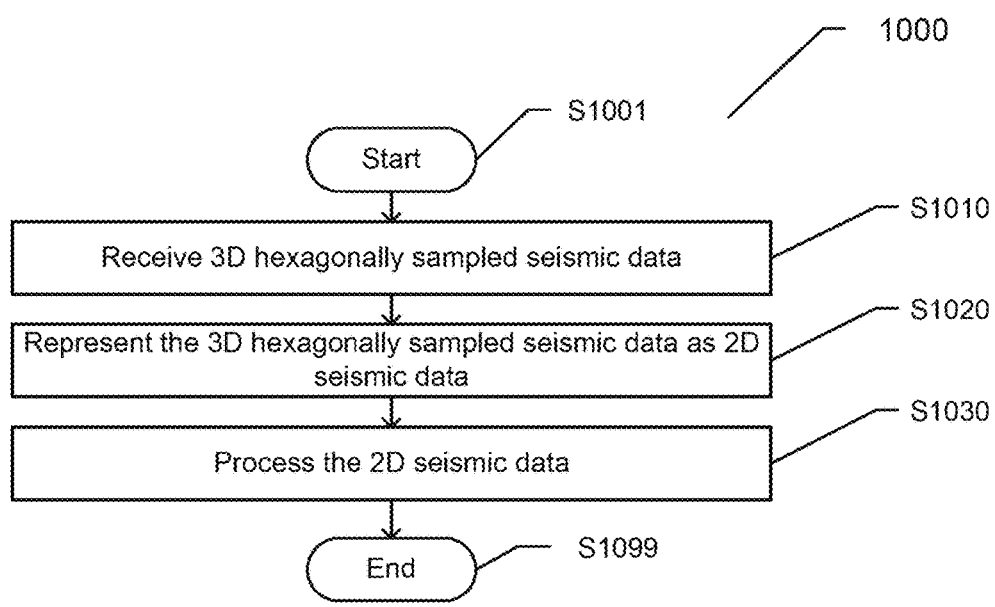
FIG. 10 shows a flow chart illustrating an exemplary process for processing hexagonally sampled seismic data according to an embodiment of the disclosure.

The above two equations are the discrete Fourier transform pair on SA. The fast Fourier transform (FFT) equations have been derived for SA in the work of L. Middleton and J. Sivaswamy, Hexagonal Image Processing: A Practical Approach. Springer, 2005, vol. 224, no. 4, which is incorporated herein by reference in its entirety FIG. 10 shows a flow chart illustrating an exemplary process 1000 for processing hexagonally sampled seismic data according to an embodiment of the disclosure. The process 1000 starts from S1001 and proceeds to S1010.

At S1010, hexagonally sampled seismic data is received. The hexagonally sampled seismic data can include a plurality of data traces each corresponding to a sampling position located at one center of a hexagon in a hexagonal grid. In an example, a seismic survey is conducted using a hexagonal grid of receivers, and hexagonally sampled seismic data is generated as a result of the seismic survey. In another example, seismic data can be produced during a seismic survey using other types of receive grade, such as a rectangular grid. Thus generated seismic data is later transformed to hexagonally sampled seismic data. In various embodiments, the hexagonally sampled seismic data can be raw data generated from a seismic survey, or the hexagonally sampled seismic data can be an intermediate production of a stage of a seismic data processing process comprising multiple stages, such as interpretation stage.

At S1020, the 3D hexagonally sampled seismic data is represented as 2D seismic data based on the SA addressing scheme. For example, each data trace of the 3D seismic data corresponding to each sampling point (position) is assigned a spiral address based on SA, and the 3D seismic data is transformed to a 2D array structure, and data traces are stored in an order of the spiral addresses of the sampling position.

At S1030, the 2D seismic data is processed with an SA based processing process or algorithms. Several examples of such SA based processing processes and algorithms are described below. The process 1000 proceeds to S1099 and terminates at S1099.

3D Filter Design for Seismic Data Acquisition Using SA

During the seismic data acquisition stage, a 3D finite impulse response (FIR) filter can be used to remove noise from seismic data generated using a hexagonal grid (hexagonally sampled seismic data). For example, the 3D FIR filter can be used during a digital group forming stage during a seismic survey employing point receivers. In an example, the 3D FIR filer is designed using a technique of projections onto convex sets (POCS) based on SA.

There are several constrained optimization problems where the constraints are specified on different domains.

These domains can be spatial or spectral. It is not always possible to apply these constraints to only one domain. If the constraints define convex sets in the set of square summable sequences, then applying alternating orthogonal projections onto these would converge to a feasible solution. This is known as POCS. This POCS method has been used to design zero-phase 3D FIR filters for the application of seismic data acquisition. In this method, the filter design problem is formulated to alternatively fulfill time domain constraints on the impulse response support and frequency domain constraints on the magnitude response bounds. Details of the POCS method are described in work of L. Gubin, B. Polyak, and E. Raik, "The method of projections for finding the common point of convex sets", pp. 1-24, 1967, and work of E. Cetin, O. N. Gerek, and Y. Yardimci, "Equiripple FIR filter design by the FFT algorithm", IEEE Signal Processing Magazine, vol. 14, no. 2, pp. 60-64, 1997. The two works are incorporated herein by reference in their entireties.

In addition, the POCS method is applied to hexagonally grid by an insertion of zeros approach, which is described in work of A. Ozbek, L. Hoteit, and G. Dumitru, "3D filter design on a hexagonal grid with applications to point-receiver land acquisition," 74th Ann., Internat. Mtg., no. October, pp. 1965-1968, 2004. However, this approach has a major problem: the insertion of zeros causes aliasing.

Figure 11:
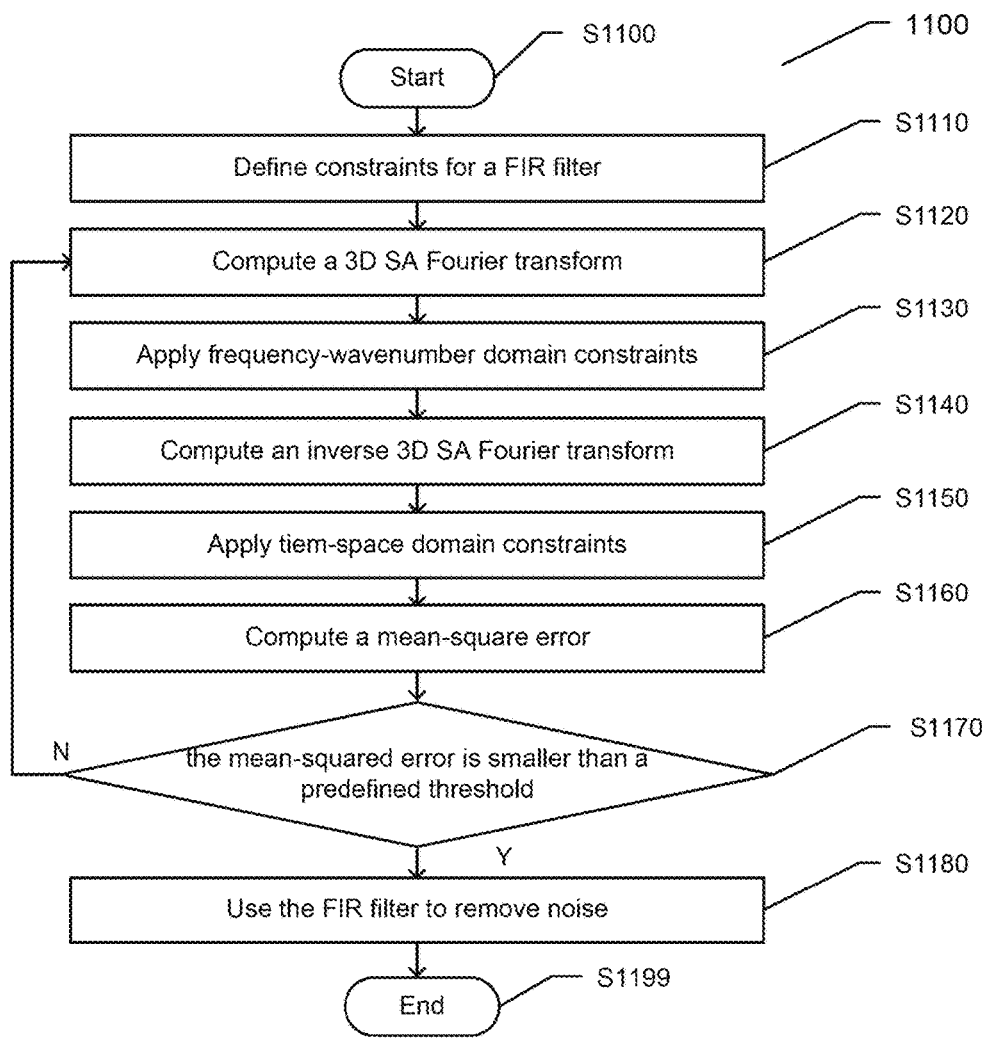
FIG. 11 shows a flow chart illustrating an exemplary process for deriving a 3D FIR filter based on SA and processing hexagonally sampled seismic data using the 3D FIR filter.

FIG. 11 shows a flow chart illustrating an exemplary process 1100 for deriving a 3D FIR filter based on SA and processing hexagonally sampled seismic data using the derived 3D FIR filter. In the process 1100, hexagonal Fourier transform and its inverse on SA are used for conducting transformation between the time-space (t-x-y) domain and frequency-wavenumber domain. The process 1100 starts from S1101 and proceeds to S1110.

At S1110, constraints for the 3D FIR filter for removing noise from the 3D hexagonally sampled seismic data is defined. For example, in order to utilize POCS to design a 3D filter, it is required that the filter must be zero phase and its frequency response in the frequency-wavenumber (f-$k_x$-$k_y$) domain, H(f, $k_x$, $k_y$), must be within tolerance ranges given by the following equation:

$$H_{id}(f,k_x,k_y) - E_d(f,k_x,k_y) \leq H_{id}(f,k_x,k_y) \leq H_{id}(f,k_x,k_y) + E_d(f,k_x,k_y).$$

In this equation, $H_{id}$ (f, $k_x$, $k_y$) is the ideal filter response, $E_d$ (f, $k_x$, $k_y$) is the desired maximum ripple level.

The ideal response and tolerance is given by the following two equations below, respectively. In the following equations, $F_P$ and $F_S$ represent the passband and stopband, $\sigma_P$ and $\sigma_S$ represent the tolerances.

$$H_{id}(f, k_x, k_y) = \begin{cases} 1, & \text{if } (f, k_x, k_y) \in F_P \\ 0, & \text{if } (f, k_x, k_y) \in F_S \end{cases}$$

$$E_d(f, k_x, k_y) = \begin{cases} \sigma_P, & \text{if } (f, k_x, k_y) \in F_P \\ \sigma_S, & \text{if } (f, k_x, k_y) \in F_S \end{cases}$$

In addition, for example, the filter must have a finite-extent support, I, in the t-x-y domain. In order to have a zero phase response requirement as mentioned earlier, I is a symmetric region around the origin. It is required by the time-domain space constraint that the values of filter coefficients must not be non-zero outside the region I. The inverse Fourier transform of the ideal frequency response is given by:

$$h_{id} = F^{-1}\{H_{id}(f,k_x,k_y)\}.$$

The initial estimate of the filter is given as:

$$h_0(t, x, y) = \begin{cases} h_{id}(t, x, y) & \text{if}(t, x, y) \in I \\ 0 & \text{otherwise} \end{cases}$$

At each iteration of steps S1120-S1160 below, the frequency-wavenumber and time-space constraints are successively applied onto the current iterate.

At S1120, a 3D SA Fourier transform $H_n$(f, $k_x$, $k_y$) of a filter $h_n$ (t, x, y) obtained from a previous iteration is computed.

At S1130, frequency-wavenumber domain constraints are applied to the filter in frequency-wavenumber domain, which is show below.

$$G_n(f, k_x, k_y) = \begin{cases} H_{id}(f, k_x, k_y) + E_d(f, k_x, k_y), \\ \quad \text{if } H_n(f, k_x, k_y) > H_{id}(f, k_x, k_y) + E_d(f, k_x, k_y), \\ H_{id}(f, k_x, k_y) - E_d(f, k_x, k_y), \\ \quad \text{if } H_n(f, k_x, k_y) < H_{id}(f, k_x, k_y) - E_d(f, k_x, k_y), \\ H_n(f, k_x, k_y), \text{ otherwise} \end{cases}$$

At S1140, an inverse 3D SA Fourier transform $g_n$(t, x, y) of the filter $G_n$(f, $k_x$, $k_y$) with applied constraints in frequency-wavenumber domain is computed.

At S1150, time-space domain constrains is applied to the filter in time-space domain to obtain an iterated filter, which is shown below.

$$h_{n+1}(t, x, y) = \begin{cases} g_n(t, x, y) & \text{if}(t, x, y) \in I \\ 0, & \text{otherwise} \end{cases}$$

At S1160, a mean-squared error between the filter $h_n$(t, x, y) obtained from the previous iteration and the iterated filter $h_{n+1}$(t, x, y).

At S1170, whether the mean-squared error is smaller than a predefined threshold is determined. When the mean-squared error is smaller than a predefined threshold, the process 1100 proceeds to S1180. Otherwise, the process 1100 proceeds to S1110.

At 1180, the filter derived from steps S1110-S1170 is used to remove noise from the 3D hexagonally sampled seismic data. The process 1100 proceeds to S1199, and terminates.

As an example, it can be proven that the POCS approach is globally convergent under specific conditions. If the constraints in the spatial and frequency domains define convex sets in the set of square summable sequences, then the application of the constraints are the orthogonal projections onto these sets. Furthermore, if the sets are intersecting, the iterations converge to a member in the intersection set. It is noted that, in one example, filters designed using POCS converge to an equiriplle filter.

Figure 12:
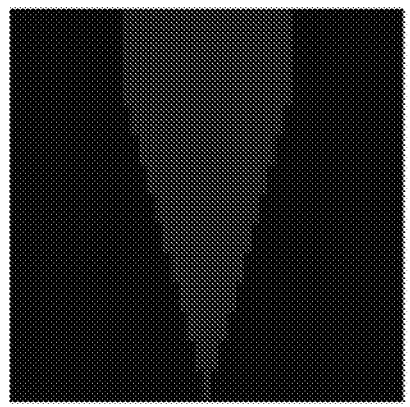
FIG. 12 shows an ideal FIR filter.
Figure 12:
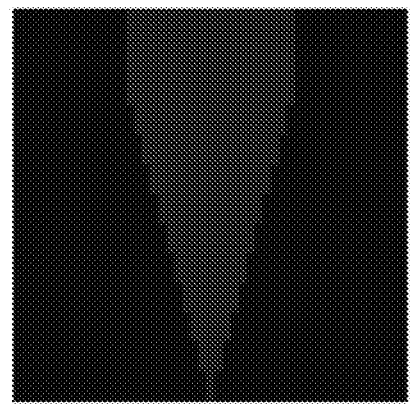
Figure 12:
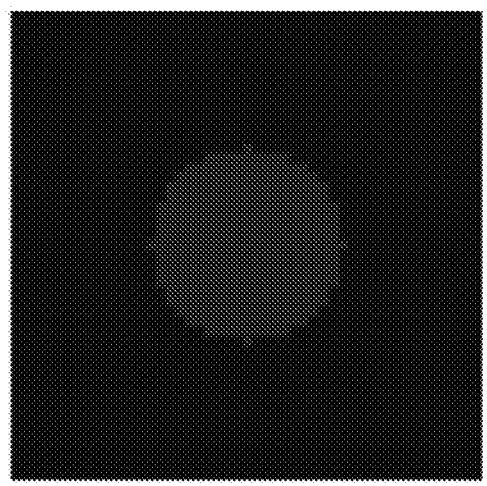
Figure 13:
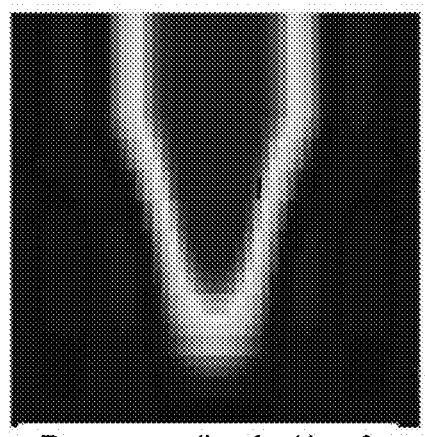
FIG. 13 shows results of a filter design using the rectangular approach.
Figure 13:
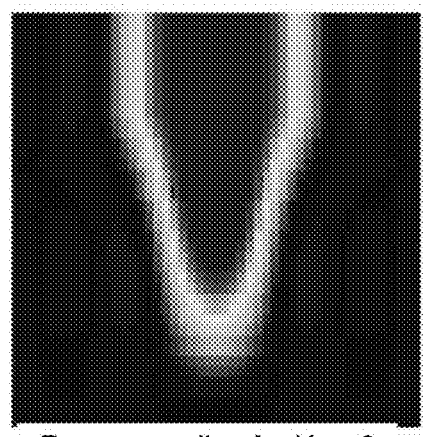
Figure 13:
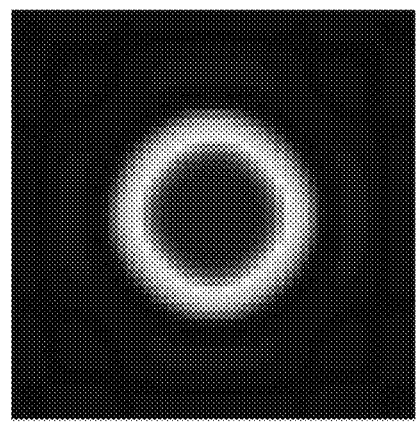
Figure 14:
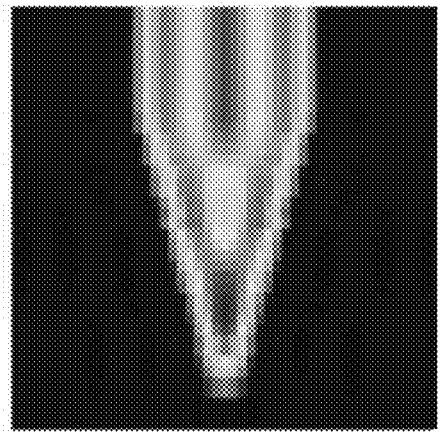
FIG. 14 shows results of a filter design using the zero insertion approach for hexagonally sampled seismic data.
Figure 14:
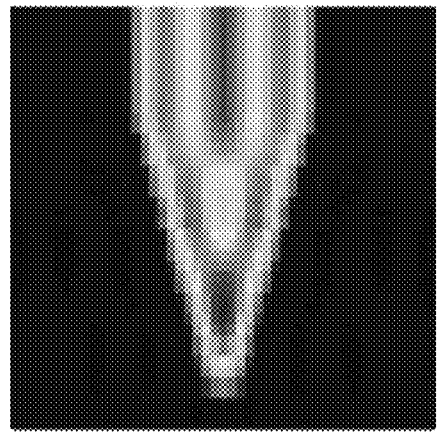
Figure 14:
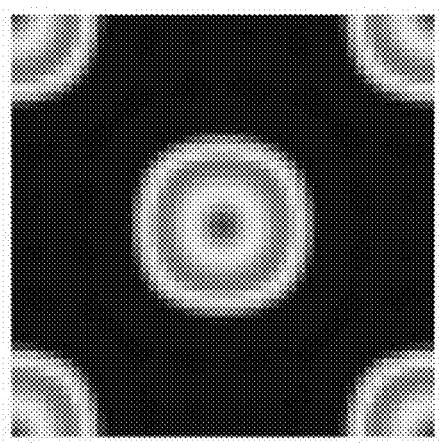
Figure 15:
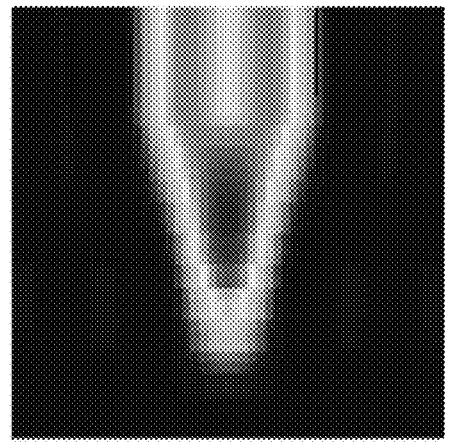
FIG. 15 shows results of a filter design using the spiral architecture approach.
Figure 15:
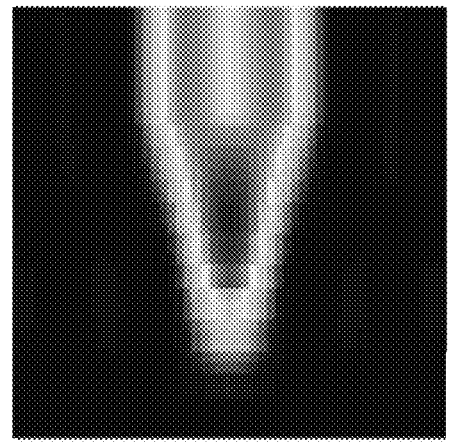
Figure 15:
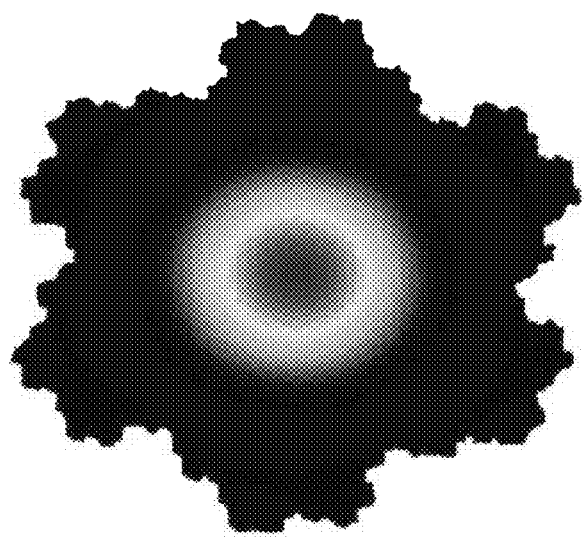

FIG. 12 shows an ideal FIR filter. The features of the designed filter in FIG. 12 include a slope of 3, passband $F_P$ of 10 and the tolerance $E_d$ as 0.02. The size of filter is 5×5×6. FIG. 13 shows results of a filter design using the rectangular approach. FIG. 14 shows results of a filter design using the zero insertion approach for hexagonally sampled seismic data. FIG. 15 shows results of a filter design using the spiral architecture approach.

Figure 16:
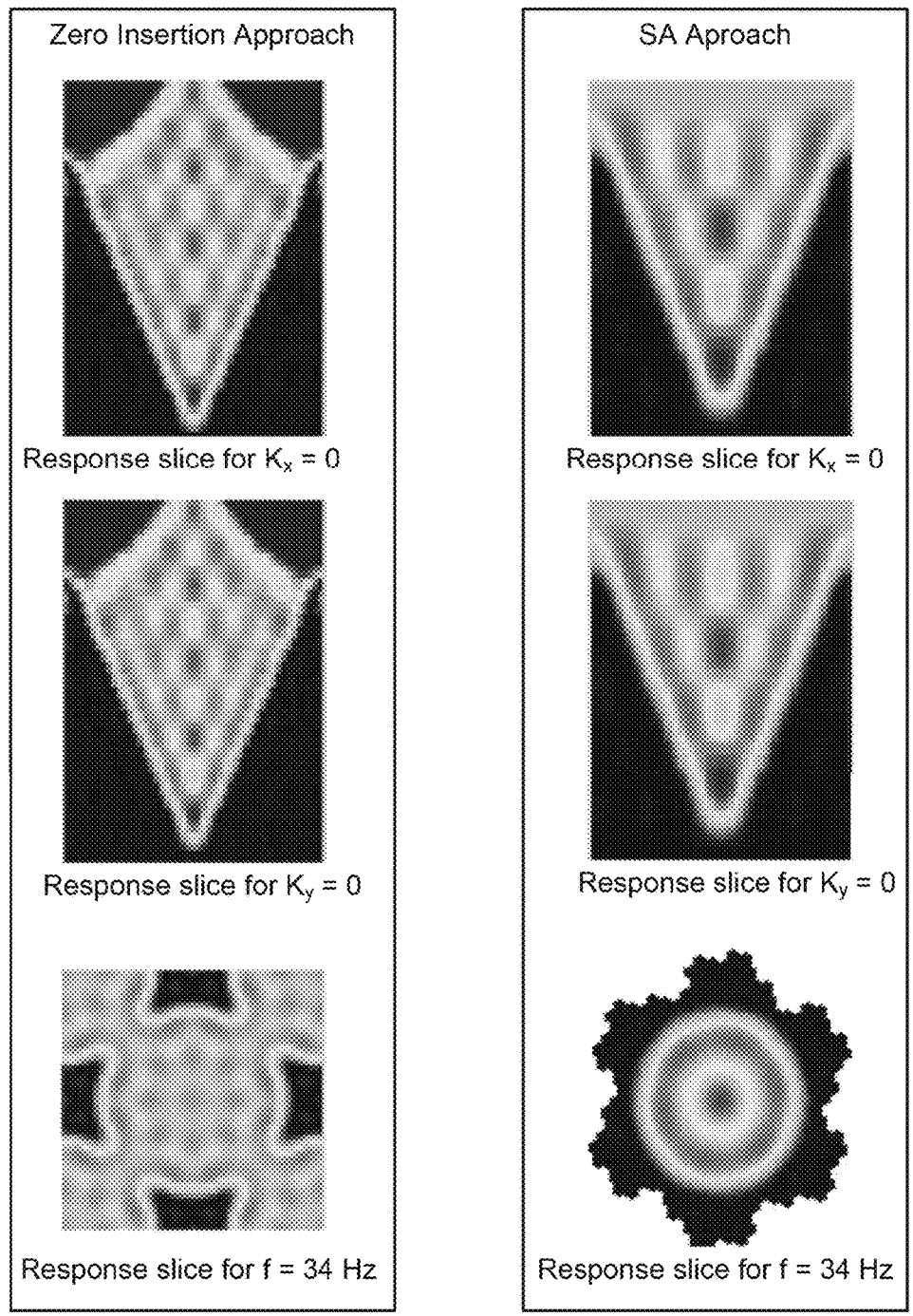
FIG. 16 shows a comparison between the hexagonal approach and the zero insertion approach for design of a filer.

It is evident from the results that spiral architecture approach is better as compared to the zero insertion approach. The zero insertion approach to hexagonal sampling introduces aliasing. This can also be seen from FIG. 16. FIG. 16 shows a comparison between the hexagonal approach and the zero insertion approach for design of a filer having a passband $F_P$ of 20, tolerance $E_d$ as 0.02, and slope of 2. As shown, in case of zero insertion, aliasing is observed in the dark regions where aliasing is taking place. On the other hand, the SA hexagonal approach is free from aliasing.

Edge Detection of Hexagonally Sampled 3D Seismic Data

Generally, seismic interpretation is greatly dependent on data visualization. The interpreter has to select and highlight the main features. Delicate geological features often appear as sharp edges and are not so easily detected. These features such as channels and faults are located with the application of edge detection algorithms. In a gray level image an area where gray level value moves from a high value to a low value or vice versa is considered an edge. Edges are indicative of a boundary between an object and a background or amongst two objects. As an example, convolution kernels can be used to process seismic data. In applications where the correlation of depth/time is irrelevant, 2D kernels can be employed. However, for scenarios which are correlated vertically, 3D kernels can be considered.

Sobel Filter

In one example, 3D edge detection Sobel filers for SA is derived and applied on hexagonally sampled seismic data. According to an aspect of the disclosure, SA based Sobel filters leads to higher accuracy in edge detection application than Sobel filers based on square sampling due to more symmetry in a hexagon than a square. The symmetric nature of neighborhood, which is nonexistent in rectangular case, is helpful in the application of circular symmetric kernels. These kernels are linked with an increased accuracy when detecting straight and curved edges.

Generally, a Sobel filter for edge detection is a discrete differentiation kernel. First order intensity gradients are used by the Sobel algorithm for edge detection. These gradients are either in x, y or z direction. These individual gradients are used to find the overall resultant output of the Sobel algorithm.

Conventional Sobel operators have been designed and applied on 2D/3D rectangular data as 2D/3D filters. For example, Sobel filters for x and y direction for 2D rectangular data can be represented respectively as:

$$G2_x = \begin{bmatrix} -1 & -2 & -1 \\ 0 & 0 & 0 \\ 1 & 2 & 1 \end{bmatrix}$$

$$G2_y = \begin{bmatrix} -1 & 0 & 1 \\ -2 & 0 & 2 \\ -1 & 0 & 1 \end{bmatrix}.$$

Sobel filters for x, y and z direction for 3D rectangular date can be represented respectively as:

$$G3_x = \begin{bmatrix} -1 & -2 & -1 \\ 0 & 0 & 0 \\ 1 & 2 & 1 \end{bmatrix} \begin{bmatrix} -2 & -4 & -2 \\ 0 & 0 & 0 \\ 2 & 4 & 2 \end{bmatrix} \begin{bmatrix} -1 & -2 & -1 \\ 0 & 0 & 0 \\ 1 & 2 & 1 \end{bmatrix}$$

$$G3_y = \begin{bmatrix} -1 & 0 & 1 \\ -2 & 0 & 2 \\ -1 & 0 & 1 \end{bmatrix} \begin{bmatrix} -2 & 0 & 2 \\ -4 & 0 & 4 \\ -2 & 0 & 2 \end{bmatrix} \begin{bmatrix} -1 & 0 & 1 \\ -2 & 0 & 2 \\ -1 & 0 & 1 \end{bmatrix}$$

$$G3_z = \begin{bmatrix} -1 & -2 & -1 \\ -2 & -4 & -2 \\ -1 & -2 & -1 \end{bmatrix} \begin{bmatrix} 0 & 0 & 0 \\ 0 & 0 & 0 \\ 0 & 0 & 0 \end{bmatrix} \begin{bmatrix} 1 & 2 & 1 \\ 2 & 4 & 2 \\ 1 & 2 & 1 \end{bmatrix}.$$

In addition, in one example, Sobel operators for hexagonally sampled seismic 2D data images based on SA for x and y direction can be represented as:

$H2_x = [0\ 2\ 1\ -1\ -2\ -1\ 1]$ $H2_y = [0\ 0\ -1\ -1\ 0\ 1\ 1].$

In an embodiment, Sober filters for x, y and z directions for hexagonally sampled seismic data based on SA are derived and shown as follows:

$$H3_x = \begin{bmatrix} 0 & 2 & 1 & -1 & -2 & -1 & 1 \\ 0 & 4 & 2 & -2 & -4 & -2 & 2 \\ 0 & 2 & 1 & -1 & -2 & -1 & 1 \end{bmatrix}$$

$$H3_y = \begin{bmatrix} 0 & 0 & -1 & -1 & 0 & 1 & 1 \\ 0 & 0 & -2 & -2 & 0 & 2 & 2 \\ 0 & 0 & -1 & -1 & 0 & 1 & 1 \end{bmatrix}$$

$$H3_z = \begin{bmatrix} 6 & 1 & 1 & 1 & 1 & 1 & 1 \\ 0 & 0 & 0 & 0 & 0 & 0 & 0 \\ -6 & -1 & -1 & -1 & -1 & -1 & -1 \end{bmatrix}$$

The magnitude of Sobel operators for 2D and 3D rectangular data are calculated as:

$G2 = \sqrt{G2_x^2 + G2_y^2}.$ $G3 = \sqrt{G3_x^3 + G3_y^3 + G3_z^3}.$

The magnitude of Sobel operators based on SA for 2D and 3D hexagonal data are calculated as:

$H2 = \sqrt{H2_x^2 + H2_y^2}.$ $H3 = \sqrt{H3_x^3 + H3_y^3 + H3_z^3}.$

Process for Processing Hexagonal Seismic Data with Sobel Filter Based on SA

Figure 17:
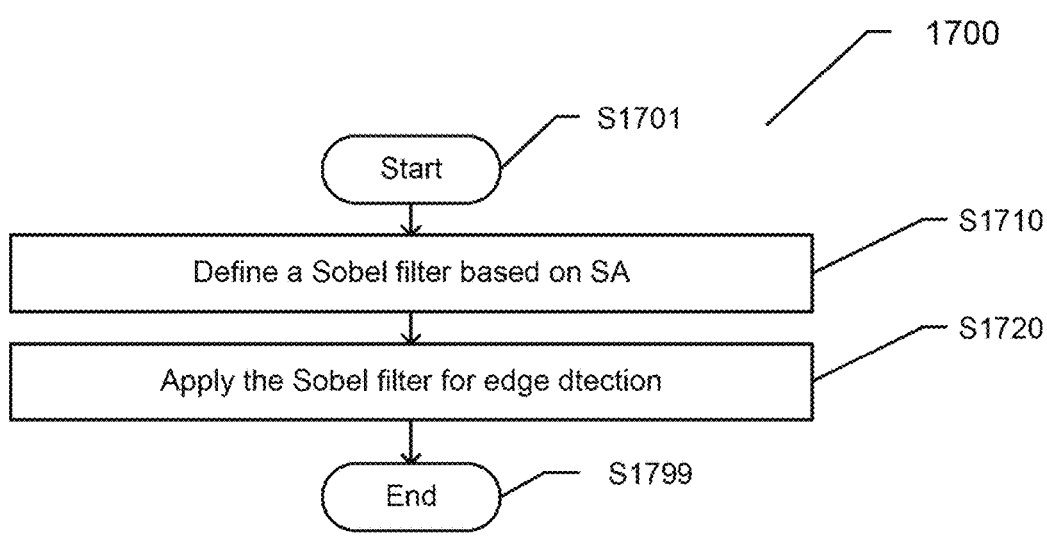
FIG. 17 shows a flow chart illustrating a process for processing 3D hexagonally sampled seismic data according to an embodiment of the disclosure.

FIG. 17 shows a flow chart illustrating a process 1700 for processing 3D hexagonally sampled seismic data according to an embodiment of the disclosure. The process 1700 starts at S1701 and proceeds to S1710.

At S1710, a Sobel filter based on SA for processing the 3D hexagonally sampled seismic data can be defined. For example, the Sobel filter may include three filters $H3_x$, $H3_y$, and $H3_z$ for x, y, and z direction as described above.

At S1720, the defined Sobel filter is applied on the 3D hexagonally sampled seismic data for edge detection. In one example, the 3D hexagonally sampled seismic data is first transformed to be represented as 2D seismic data using the SA addressing scheme. Thereafter, the Sobel filer is applied to the 2D seismic data for edge detection. The process proceeds to S1799 and terminates.

Simulation of Sobel Edge Detection Based on SA

In an example, a 3D seismic data set containing a channel is used in a test. The 3D seismic data set is rectangularly sampled, thus in rectangular format. The 3D seismic data set in rectangular format is first converted to a 3D seismic data set in hexagonal format. Thereafter, Sobel filters based on rectangular sampling are applied to the seismic data set in rectangular format, while Sobel filters based on hexagonal sampling are applied to the seismic data set in hexagonal format. The resultant images from these two approaches are compared. The comparison reveals that the hexagonal approach is visibly better for detection of curves, which is due to the inherent increased symmetric nature of a hexagon as compared to that of a square.

Figure 18A:
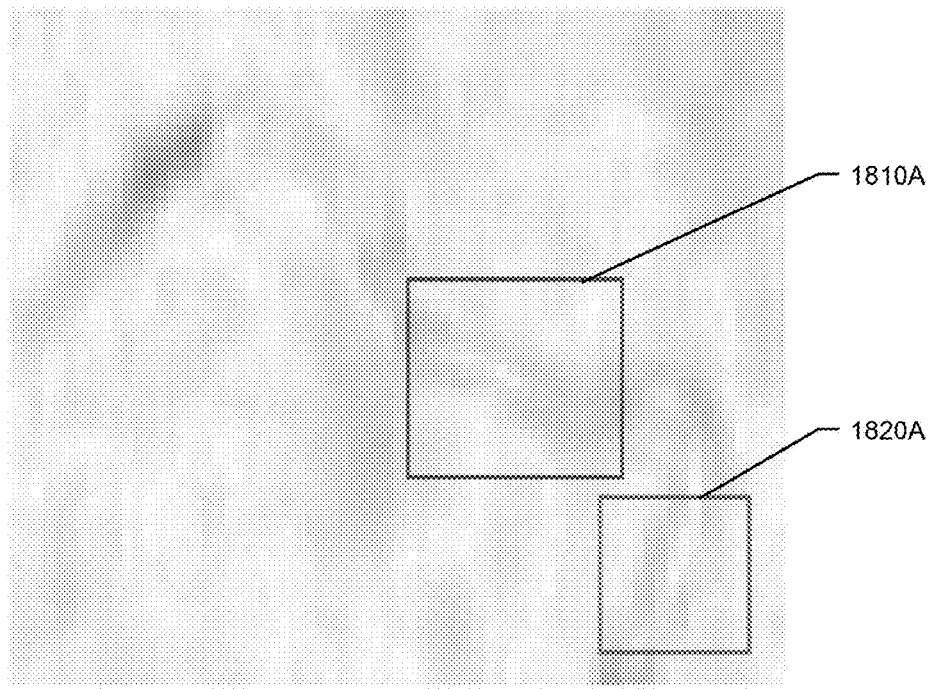
FIG. 18A shows a zoomed section of a slice of the rectangularly sampled seismic data set with rectangular Sobel filters applied.
Figure 18B:
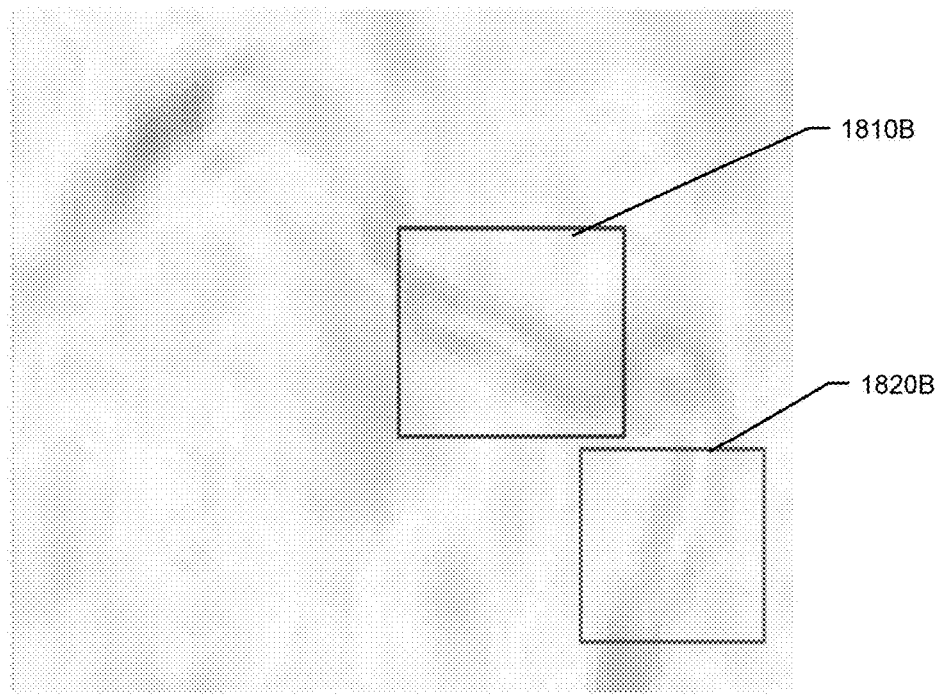
FIG. 18B shows a zoomed section of a slice of the hexagonally sampled seismic data set with hexagonal Sobel filters applied.

FIG. 18A shows a zoomed section of a slice of the rectangularly sampled seismic data set with rectangular Sobel filters applied. FIG. 18B shows a zoomed section of a slice of the hexagonally sampled seismic data set with hexagonal Sobel filters applied. In FIG. 18A where rectangular approach is applied, curves are portrayed as stair case, whereas in FIG. 18B where hexagonal approach is applied, the curves are smoother. For example, curves in block 1810A are smoother compared to that in block 1810B. In addition, FIG. 18A shows a highly pixilated view in block 1810A. Blocks 1820A and 1820B show similar effects as with blocks 1810A and 1810B.

Figure 19A:
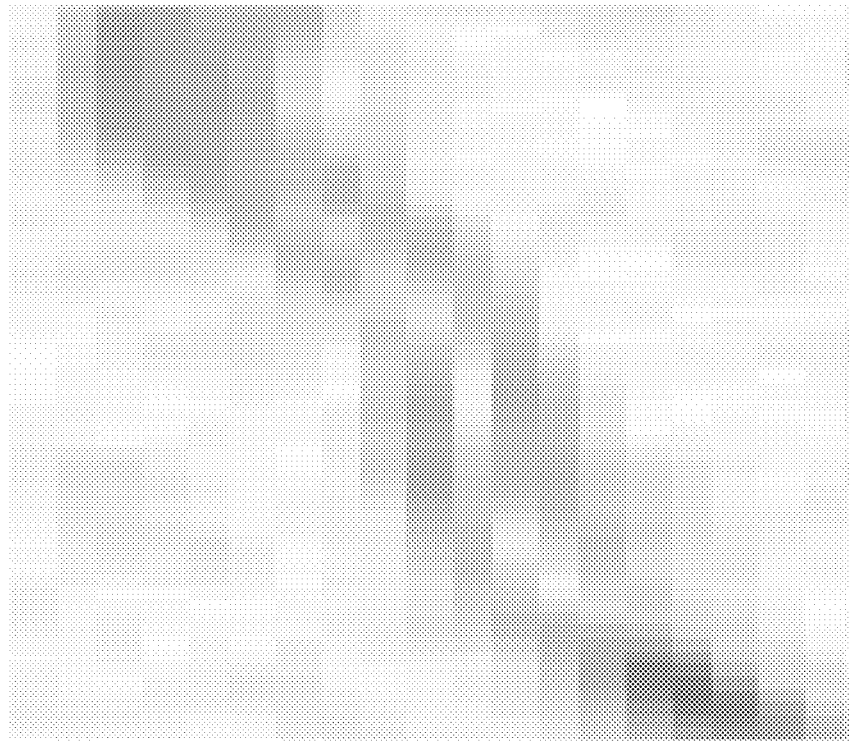
FIG. 19A shows a staircase edge representation of a diagonal line in rectangularly sampled seismic data with rectangular Sobel filters applied.
Figure 19B:
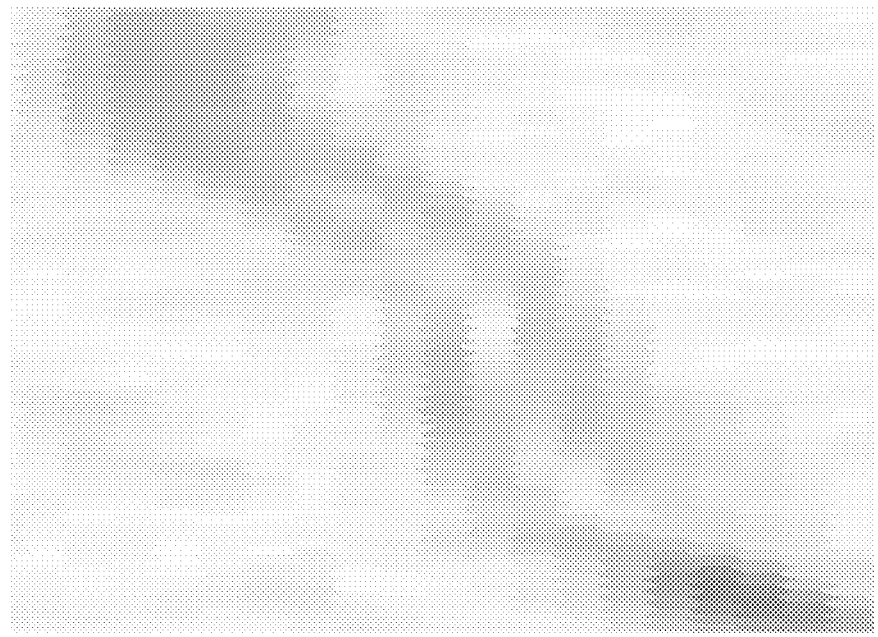
FIG. 19B shows a staircase edge representation of a diagonal line in hexagonally sampled seismic data with hexagonal Sobel filters applied.

FIG. 19A shows a staircase edge representation of a diagonal line in rectangularly sampled seismic data with rectangular Sobel filters applied. FIG. 19B shows a staircase edge representation of a diagonal line in hexagonally sampled seismic data with hexagonal Sobel filters applied. As shown, hexagonal Sobel filters give a well-defined curve in FIG. 19B, whereas rectangular Sobel filters represent the curve in a step wise manner.

Figure 20A:
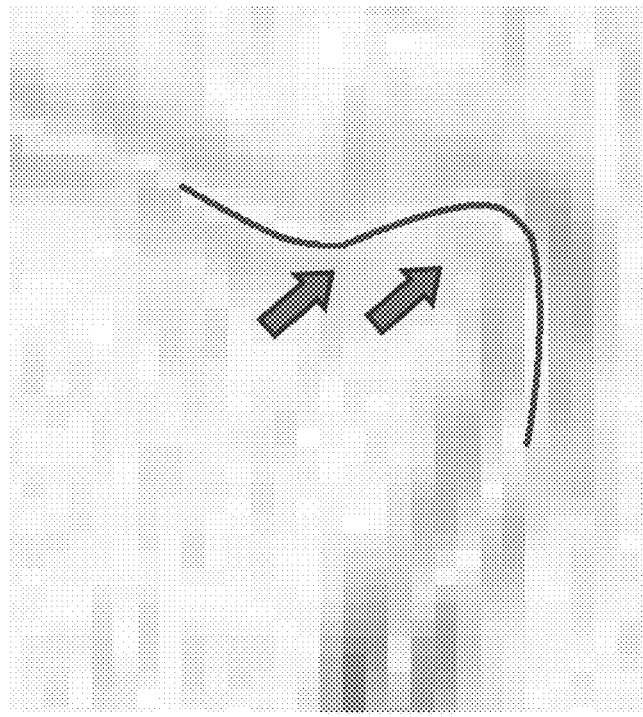
FIG. 20A shows a blurred edge in rectangularly sampled seismic data with rectangular Sobel filters applied.
Figure 20B:
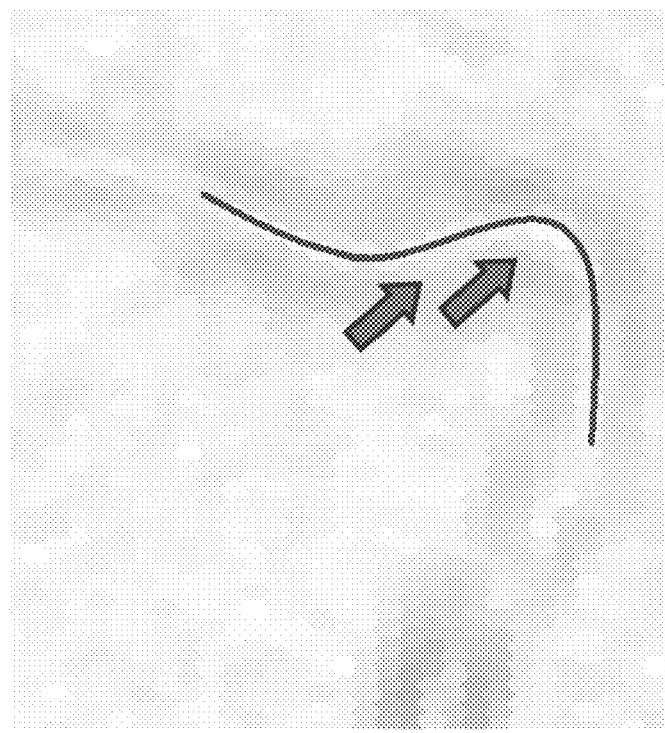
FIG. 20B shows an edge in hexagonally sampled seismic data with hexagonal Sobel filters applied.

FIG. 20A shows a blurred edge in rectangularly sampled seismic data with rectangular Sobel filters applied. FIG. 20B shows the same edge in hexagonally sampled seismic data with hexagonal Sobel filters applied. The arrows point to the blurred edge in FIG. 20A, while the hexagonal approach preserves this edge as shown in FIG. 20B.

Computational Efficiency

The ability of SA to handle 3D data as 2D data is computationally a significant advantage. In addition, the fact that 13.4% lesser samples are required as compared to the typical rectangular approach results in lesser data thus increased processing efficiency. Further the size of the convolution kernel is 28.57% more in case of a rectangular filter, and the number of multiplications and additions for 3D convolution in case of rectangular sampling is 47% more as compared to the SA scenario. Owing to all the benefits mentioned above, the computational time is exponentially reduced.

Another major reason for a significant reduction in time is the fact that the number of nested loops for SA approach (hexagonal approach) is 50% less in case of 2D convolution, and 33% in case of 3D operations. Consequently, the processing time for a data of size 369×369×25 on a core i5 2.4 GHz processor system with a 2 GB RAM, is 9.6 seconds for hexagonal approach and 200 times more i.e., 1960 seconds for the rectangular approach. For the purpose of comparing the processing time with the rectangular approach, nested for loops have been used as they are being used in SA approach. This computational saving is a significant factor when considering huge 3D data sets. The computational efficiency is evident from the Table 4.1. The table 4.1 shows a computational comparison between convolution computations of 3D rectangular Sobel filters and 3D hexagonal Sobel filers. The size of the data is 117649 data samples per slice in hexagonal case while 368×368 per slice in the rectangular domain.

| Sampling approach | Time for 25 slices in seconds | Time for 50 slices in seconds | Time for 75 slices in seconds | Time for 150 slices in seconds |
|---|---|---|---|---|
| Rectangular approach | 1958 | 3909 | 6379 | 11600 |
| Hexangonal approach | 9.6 | 11.02 | 14.13 | 30.08 |
| Efficiency of hexagonal approach | 204 times faster | 355 times faster | 451 times faster | 385 times faster |

Edge Preserving Smoothing for 3D Hexagonally Sampled Seismic Data

Generally, the seismic data near fractures/faults contains relatively more noise than other area, and seismic edge detection algorithms are sensitive to the effects of noise. An approach for reducing noise before edge detection is to apply a low pass or averaging filter. The disadvantage of this type of noise removal is that it results in blurred sharp edges. In one example, edge preserving smoothing (EPS) algorithm based on SA is used for hexagonally sampled seismic data before application of edge detection algorisms, e.g., Sobel filters. EPS algorithms based on SA have advantages of less samples and efficient processing associated with SA in addition to qualitatively better results when compared to rectangular case.

In an example of EPS algorithm, one data sample is initially selected from a seismic data set. Then, the most homogenous neighborhood around the selected data sample is identified. Thereafter, the average of data samples in that particular neighborhood is calculated. Finally, this average value replaces the value of the selected data sample. This process is repeated upon all data samples in seismic data set.

Figure 21:
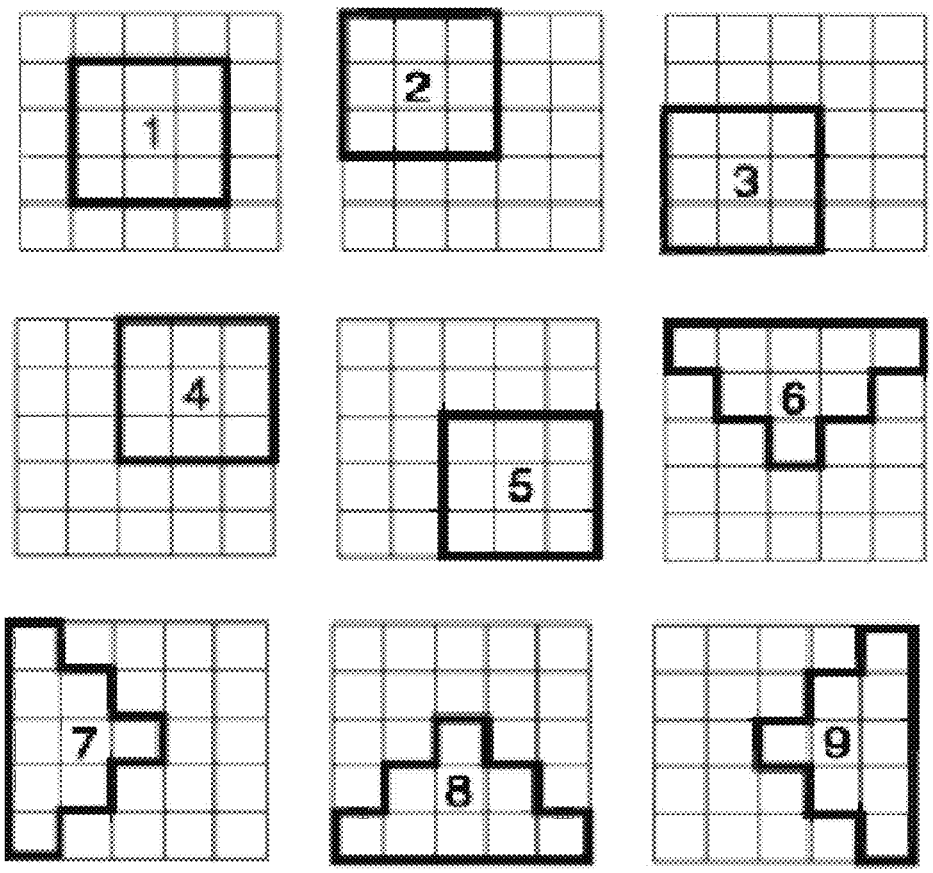
FIG. 21 shows one neighborhood definition example of rectangular seismic data.

Generally, neighborhoods need to be defined to run an EPS algorithm. There are many options available for rectangular domain where seismic data is rectangularly sampled. Researchers have generally used 4, 5 and 9 neighborhoods for EPS. The fundamental requirement of these neighborhood definitions is that the data samples of these various neighborhoods are connected and the data sample under consideration is a part of these neighborhoods. FIG. 21 shows one neighborhood definition example of rectangular seismic data. In FIG. 21, the window size for selecting a neighborhood is 5×5 and 9 neighborhoods numbered from 1 to 9 are defined. There can be other type of neighborhoods based on the window size and the shape of individual neighborhood within the window.

Figure 22:
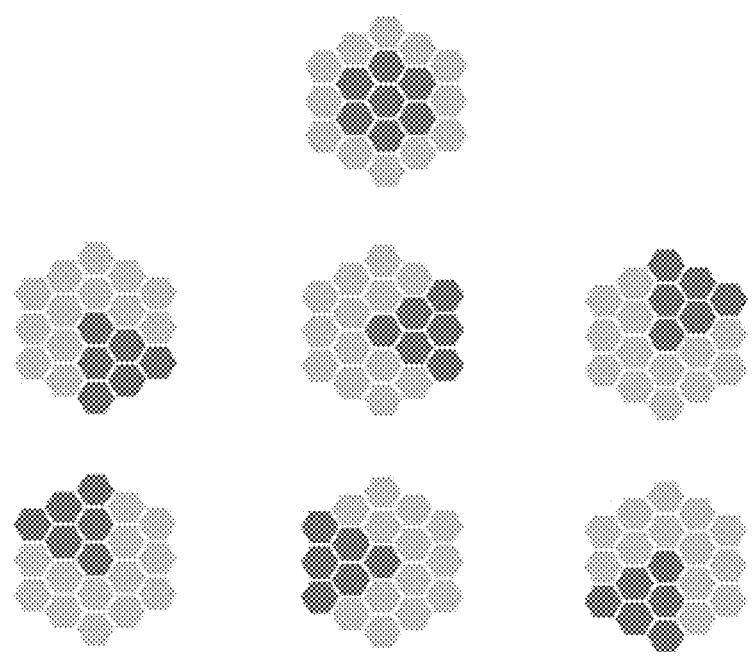
FIG. 22 and FIG. 23 show two exemplary alternatives for neighborhood definition for seismic data represented using SA.
Figure 23:
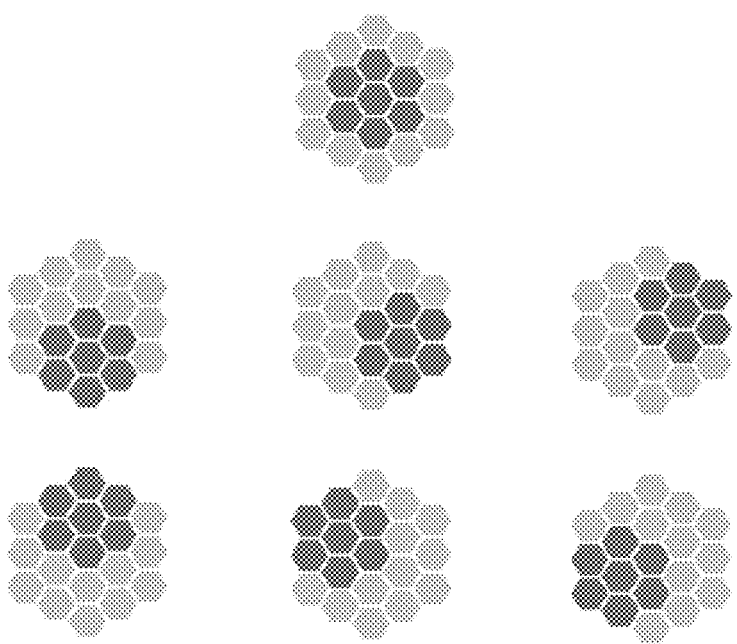

For the hexagonal case where 2D or 3D seismic data is represented using SA, each data sample has six direct neighbors for distance level 1 and 19 neighbors for distance level 2. FIG. 22 and FIG. 23 show two exemplary alternatives for neighborhood definition for seismic data represented using SA, where the defined neighborhoods are in darker color.

It is noted that the size of neighborhood window should be chosen as per the expected size of edges that are to be determined. If the width of an edge is smaller than the window size, than the edge might be considered noise and removed by EPS. In addition, maintaining a balance between noise removal and preservation of sharp edges demands that the averaging should not take place in an area which consists of edges. Accordingly, the most uniform neighborhood is required to be determined. If an area contains an edge, the variance of that neighborhood will be high as compared to a homogenous region.

Process for Processing Hexagonally Sampled Seismic Data with EPS

Figure 24:
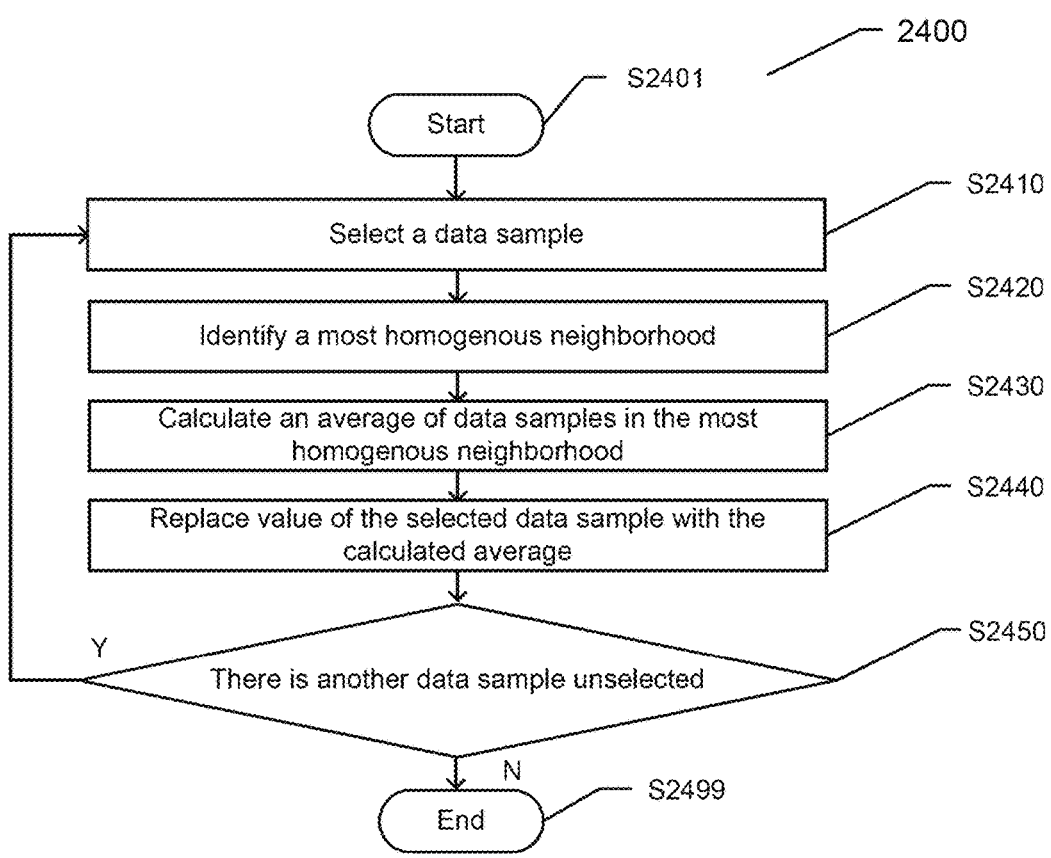
FIG. 24 shows a flow chart illustrating an exemplary EPS process based on SA for processing hexagonally sampled seismic data according to an aspect of the disclosure.

FIG. 24 shows a flow chart illustrating an exemplary EPS process 2400 based on SA for processing hexagonally sampled seismic data according to an aspect of the disclosure. The process 2400 starts at S2401 and proceeds to S2410.

At S2410, a data sample is selected from the hexagonally sampled seismic data. The data sample belongs to a data set representing an image of subsurface generated from the hexagonally sampled seismic. In one example, the hexagonally sampled seismic data is originally generated from a hexagonal sampling grid. In another example, the hexagonally sampled seismic is transformed from seismic data generated from rectangular sampling. In various examples, the hexagonally sampled seismic data can be an intermediate production of any stages in a seismic data processing process, e.g., acquisition stage, interpretation stage, etc.

At S2420, a most homogenous neighborhood defined based on SA around the selected data sample in the image of subsurface is identified. In an example, this identification process includes the following steps: (a) selecting a plurality of neighborhoods around the selected data sample. The neighborhoods are defined based on SA. For example, the neighborhoods can be defined as shown in FIG. 22 or 23. (b) calculating a standard deviation of data samples within each of the plurality of neighborhoods. (c) identifying the most homogeneous neighborhood as the one of the plurality of neighborhoods having the lease standard deviation.

At S2430, an average of data samples in the most homogenous neighborhood is calculated.

At S2440, value of the selected data sample is replaced with the calculated average.

At S2550, whether there is another data sample in the image of subsurface which is unselected is determined. If there is another unselected data sample, the process 2400 proceeds to S2410. Otherwise, the process 2400 proceeds to S2499 and terminates.

Simulation of EPS Based on SA

In a simulation test, effect of EPS based on SA is compared with effect of EPS based on rectangular sampling. Specifically, EPS is applied to synthetic hexagonally sampled data and rectangularly sampled data. The EPS based on SA uses neighborhood definition shown in FIG. 23, while the EPS based on rectangular sampling uses neighborhood definition shown in FIG. 21.

Figure 25:
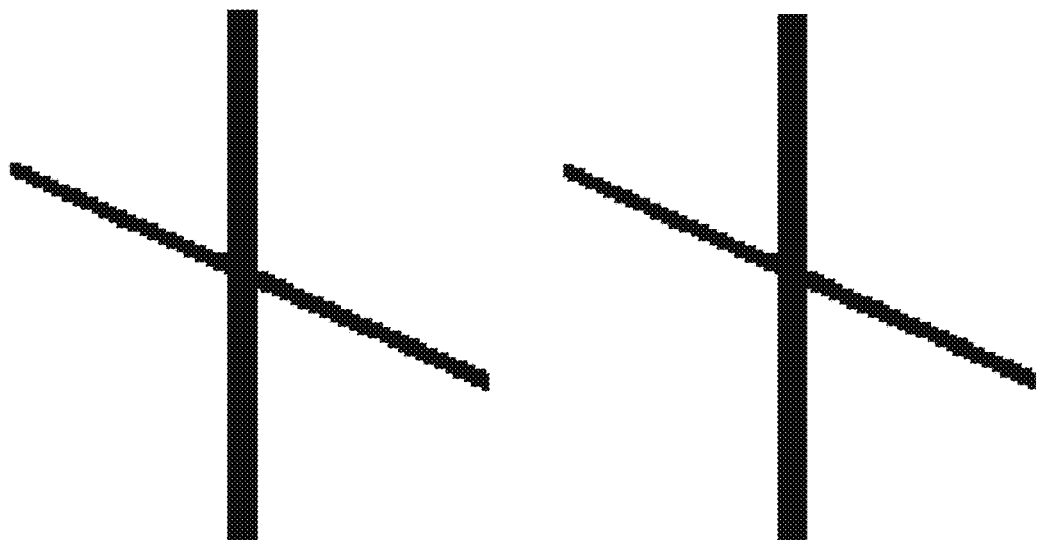
FIG. 25 shows images of rectangularly sampled data and hexagonally sampled data without noise, and images of data after EPS is applied.
Figure 25:
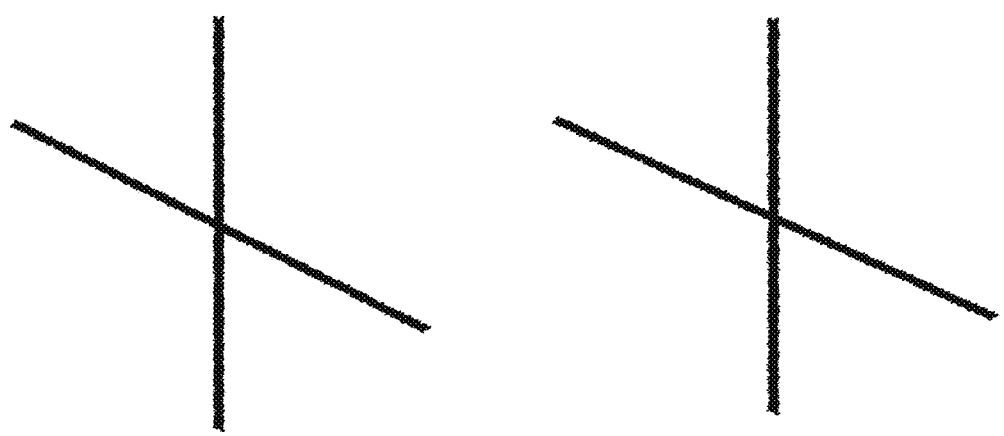
Figure 26:
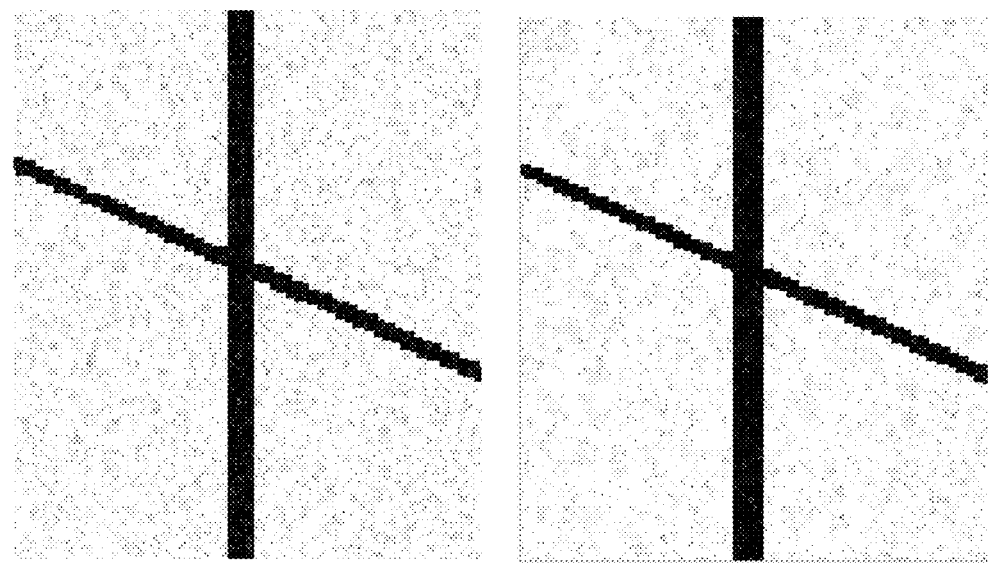
FIGS. 26-28 show similar images but with 10%, 30%, and 50% noise, respectively.
Figure 26:
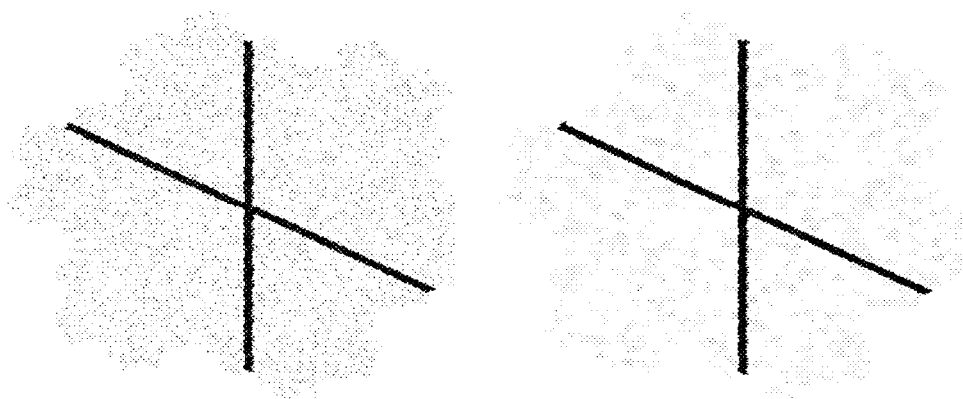
Figure 27:
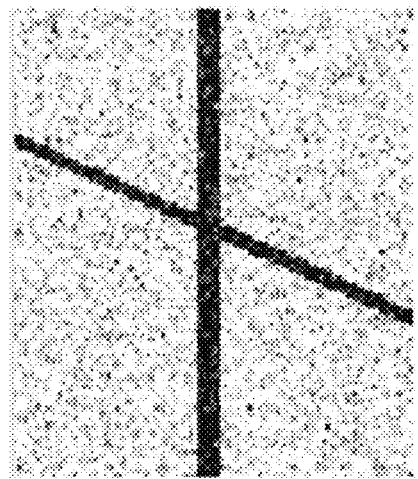
Figure 27:
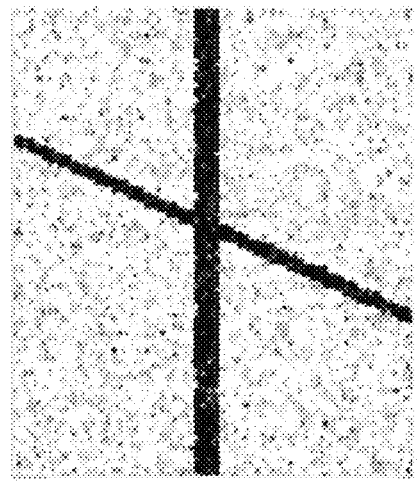
Figure 27:
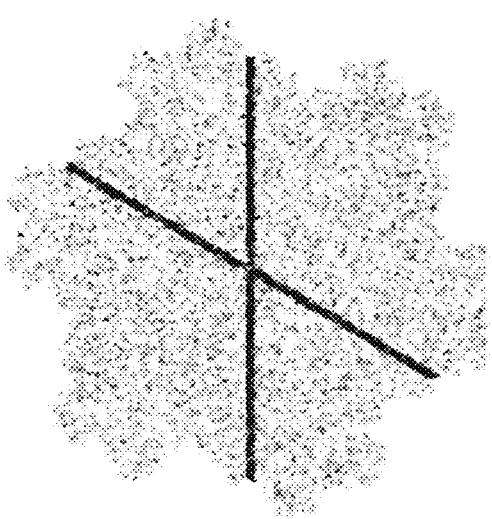
Figure 27:
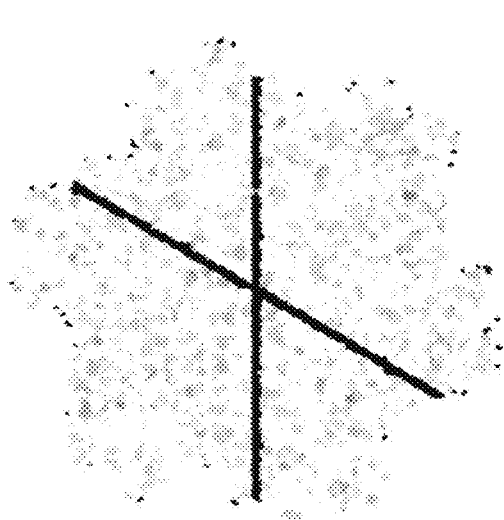
Figure 28:
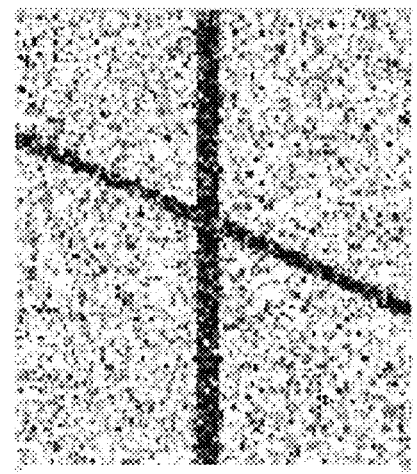
Figure 28:
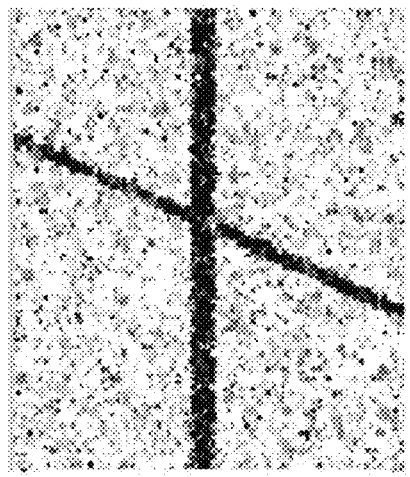
Figure 28:
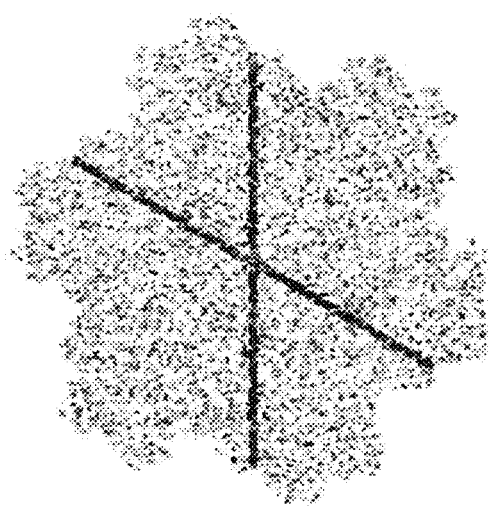
Figure 28:
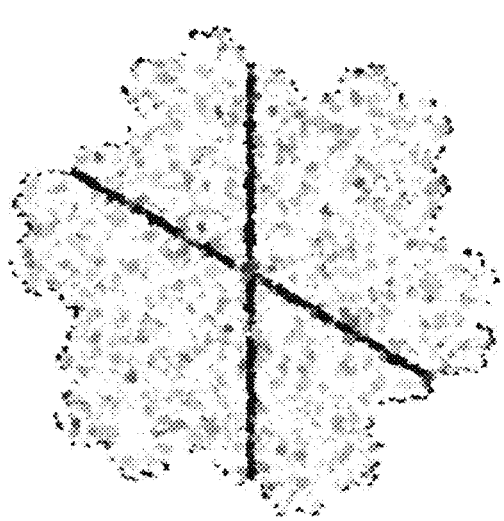

FIG. 25 shows images of rectangularly sampled data and hexagonally sampled data without noises, and images of data after EPS is applied. FIGS. 26-28 show similar images but with 10%, 30%, and 50% noise, respectively. The synthetic data consists of one vertical line and one diagonal line in each test scenario. The hexagonally sampled data has a length of 74 and the rectangularly sampled data has a size of 72×72. As shown in FIG. 25, the EPS based on SA or rectangular sampling has no effect on the edges, and the sharpness of the edges is maintained in both sampling approaches. As shown in FIGS. 26-28, as more noise is introduced, EPS successfully suppresses it while maintaining the crispness of the edges. In addition, the noise suppression is visibly improved in hexagonal case where EPS based on SA is applied on hexagonally sampled data.

Computer System Implementing SA Based Processes and Algorithms

Figure 29:
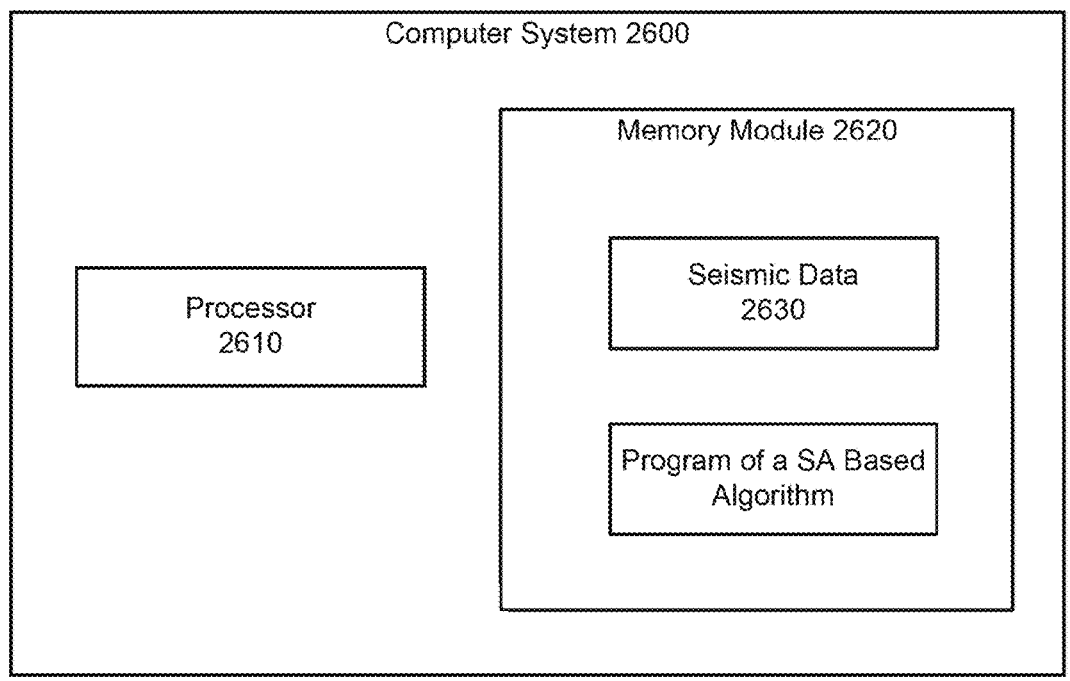
FIG. 29 shows a block diagram of a computer system according to an embodiment of the disclosure.

FIG. 29 shows a block diagram of a computer system 2900 according to an embodiment of the disclosure. As an example, the computer system 2900 implements the SA based processes and algorithms. The computer system 2900 includes hardware components, such as a processor 2910, a memory module 2920, and the like, and software components, such as various code instructions and seismic data stored in the memory module 2920. The hardware components operate according to the software components to perform various tasks.

The computer system 2900 can be any suitable device, such as a desktop computer, a laptop computer, a mobile phone, a tablet, a multimedia player, a pocket calculator, a personal digital assistant (PDA), and the like. The computer system 2900 can include other suitable components (not shown), such as a display, a touchscreen, a microphone, a communication component, and the like. In an embodiment, the computer system 2900 includes a single integrated circuit (IC) chip that integrates various circuits, such as the processor 2910, the memory module 2920, and the like on the single IC chip. In another embodiment, the computer system 2900 includes multiple IC chips, such as a processor chip, a memory chip and the like.

The processor 2910 includes one or more processing units to execute various code instructions or programs to perform various tasks. In an example, the processor 2910 is a multi-core processor, such as a dual-core processor, a quad-core processor, and the like. Further, the processor 2910 can have any suitable architecture, such as an x86 architecture, a reduced instruction set computing (RISC) architecture, a complex instruction set computing (CISC) architecture, and the like.

The memory module 2920 includes one or more storage media that provide memory space for various storage needs. In an example, the memory module 2920 stores code instructions or programs to be executed by the processor 2910 and stores seismic data to be processed by the processor 2910. In another example, the memory module 2920 includes memory spaces allocated for system storage storing, for example, an operation system and other related applications. The storage media include, but are not limited to, hard disk drive, optical disc, solid state drive, read-only memory (ROM), dynamic random access memory (DRAM), static random access memory (SRAM), flash memory, and the like.

In one example, a memory space 2930 is allocated in the memory module 2920 to store seismic data. The seismic data can be hexagonally sampled seismic data or rectangularly sampled data. The seismic data can be generated from a sampling grid during a seismic survey, or can be an intermediate production of a stage during a seismic data processing process. In the example, another memory space 2940 is allocated in the memory module 2920 to store one or more programs each corresponding to a SA based algorithm or process for processing hexagonally sampled seismic data as described above. For example, the SA based algorithms or processes for processing hexagonally sampled seismic data can include a 3D FIR filer based on SA, an edge detection filter based on SA, or an EPS algorithm based on SA. When a program stored in the memory space 2940 is executed by the processor 2910, the processor 2910 performs functions of the processes or algorithms corresponding to the program to process a seismic data set stored in the memory space 2930.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for processing three-dimensional (3D) hexagonally sampled marine seismic data, comprising:
   producing seismic waves and recording reflections of the seismic waves as 3D hexagonally sampled seismic data;
   receiving 3D hexagonally sampled seismic data represented using 3D spiral architecture (SA), the 3D hexagonally sampled seismic data including a plurality of data traces each corresponding to center of a hexagon in the 3D SA;
   representing the 3D hexagonally sampled seismic data as two-dimensional (2D) seismic data using spiral architecture (SA) addressing scheme; and
   processing the 2D seismic data with a finite impulse response (FIR) filter.

2. The method of claim 1, wherein the 3D hexagonally sampled seismic data is generated from a hexagonal grid of receivers.

3. The method of claim 1, wherein the 3D hexagonally sampled seismic data is transformed from seismic data generated from a rectangular grid.

4. The method of claim 1, wherein the 3D hexagonally sampled seismic data is an intermediate production of a stage of a seismic data processing process.

5. The method of claim 1, wherein the representing the 3D hexagonally sampled seismic data as two-dimensional (2D) seismic data using spiral architecture (SA) addressing scheme includes:
   assigning a spiral address to each data trace of the 3D hexagonally sampled seismic data, and
   storing the data traces in an order of the spiral addresses.

6. The method of claim 1, wherein processing the 2D seismic data with an SA based signal processing process includes performing an edge preserving smoothing process that comprises:
   selecting a data sample from an image of subsurface generated from the 2D seismic data;
   identifying a most homogenous neighborhood from neighborhoods defined based on SA around the selected data sample through a process including:
     selecting a plurality of neighborhoods defined based on SA around the selected data sample,
     calculating a standard deviation of data samples within each of the plurality of neighborhoods, and
     identifying the most homogeneous neighborhood as the one of the plurality of neighborhoods having the lease standard deviation;
   calculating an average of data samples in the most homogenous neighborhood; and
   replacing value of the selected data sample with the calculated average.

* * * * *